(12) United States Patent
Van der Auwera et al.

(10) Patent No.: US 9,338,476 B2
(45) Date of Patent: May 10, 2016

(54) FILTERING BLOCKINESS ARTIFACTS FOR VIDEO CODING

(75) Inventors: Geert Van der Auwera, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 942 days.

(21) Appl. No.: 13/466,831

(22) Filed: May 8, 2012

(65) Prior Publication Data

US 2012/0287994 A1 Nov. 15, 2012

Related U.S. Application Data

(60) Provisional application No. 61/485,442, filed on May 12, 2011, provisional application No. 61/492,761, filed on Jun. 2, 2011, provisional application No. 61/499,563, filed on Jun. 21, 2011, provisional application No. 61/506,938, filed on Jul. 12, 2011.

(51) Int. Cl.
*H04N 7/12* (2006.01)
*H04N 19/82* (2014.01)
*H04N 19/159* (2014.01)
*H04N 19/176* (2014.01)
*H04N 19/117* (2014.01)

(52) U.S. Cl.
CPC ............. *H04N 19/82* (2014.11); *H04N 19/117* (2014.11); *H04N 19/159* (2014.11); *H04N 19/176* (2014.11)

(58) Field of Classification Search
CPC ... H04N 19/176; H04N 19/46; H04N 19/139; H04N 19/61; H04N 19/119; H04N 19/159; H04N 19/117; H04N 19/82

USPC ......................................... 375/240.12, 240.29
See application file for complete search history.

(56) References Cited

U.S. PATENT DOCUMENTS 7,995,849 B2   8/2011   Raveendran et al.
8,325,804 B2   12/2012  Haddad et al.
(Continued)

FOREIGN PATENT DOCUMENTS

CN           101529916 A    9/2009
JP           2010154264 A   7/2010
(Continued)

OTHER PUBLICATIONS

Van der Auwera et al., "CE6.b: SDIP Harmonization with Deblocking, MDIS and HE Residual Coding", JCT-VC Meeting; MPEG Meeting; Jul. 14-22, 2011; Torino; (Joint Collaborative Team on Video Coding of ISO / IEC JTC1/SC29/WG11 and ITU-T SG.16) ; URL: http://wftp3.itu.int/av-arch/jctvc-site/,, No. JCTVC-F556, XP030009579, 15 pp.

(Continued)

*Primary Examiner* — Allen C Wong
(74) *Attorney, Agent, or Firm* — Shumaker & Sieffert, P.A.

(57) ABSTRACT

In one example, an apparatus for coding video data includes a video coder configured to determine a first prediction mode for a first block of video data and a second prediction mode for a second block of video data, wherein the first block and the second block share a common edge, decode the first block using the first prediction mode and the second block using the second prediction mode, and determine whether to deblock the common edge between the first block and the second block based at least in part on whether at least one of the first prediction mode and the second prediction mode comprises short distance intra-prediction (SDIP).

37 Claims, 13 Drawing Sheets

(56) References Cited

U.S. PATENT DOCUMENTS

| | | | |
|---|---|---|---|
| 2006/0056416 A1* | 3/2006 | Yang et al. | 370/395.2 |
| 2006/0126962 A1* | 6/2006 | Sun | 382/268 |
| 2006/0146941 A1 | 7/2006 | Cha et al. | |
| 2008/0123750 A1 | 5/2008 | Bronstein et al. | |
| 2008/0304569 A1 | 12/2008 | Lee et al. | |
| 2009/0077143 A1 | 3/2009 | Macy, Jr. | |
| 2009/0196342 A1 | 8/2009 | Divorra Escoda et al. | |
| 2010/0118945 A1* | 5/2010 | Wada et al. | 375/240.12 |
| 2010/0254463 A1* | 10/2010 | Narroschke | H04N 19/147 375/240.29 |
| 2011/0110427 A1 | 5/2011 | Teng et al. | |
| 2013/0022107 A1 | 1/2013 | Van Der Auwera et al. | |

FOREIGN PATENT DOCUMENTS

| | | |
|---|---|---|
| WO | WO2009126299 A1 | 10/2009 |
| WO | WO2010051846 A1 | 5/2010 |

OTHER PUBLICATIONS

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Cheng et al., "CE8 Subtest1: Improved Deblocking Filter", JCT-VC Meeting; MPEG Meeting; Jan. 20-28, 2011, Daegu; (Joint Collaborative Team on Video Coding of ISO/IEC JTC1/SC29/WG11 and ITU-T SG. 16); URL: http://wftp3.itu.int/av-arch/jctvc-site/,, No. JCTVC-D163, XP030008203, ISSN: 0000-0015, 8 pp.

Chiou, et al., "Performance Improvement of Distributed Video Coding by Using Block Mode Selection," Proceedings of the International Conference on Multimedia (MM '10), Oct. 2010, ACM, New York, NY, USA, pp. 1207-1210.

Francois et al., "Description of Core Experiment 2: Flexible Motion Partitioning", MPEG Meeting; Oct. 7-15, 2010; Guangzhou; (Motion Picture Expert Group or ISO/IEC JTC1/SC29/WG11)., No. M18602, XP030047192, 6 pp.

Ikeda et al., "Parallel deblocking filter", MPEG Meeting; Jan. 24-28, 2011; Daegu; (Motion Picture Expert Group or ISO/IEC JTC1/SC29/WG11), No. 11119027, XP030047595, 7 pp.

International Preliminary Report on Patentability—PCT/US2012/037113, The International Bureau of WIPO—Geneva, Switzerland, Aug. 5, 2013, 11 pp.

International Search Report and Written Opinion—PCT/US2012/037113—ISA/EPO—Aug. 2, 2012, 7 pp.

I"ITU-T H.264, Series H: Audiovisual and Multimedia Systems, Infrastructure of audiovisual services—Coding of moving video, Advanced video coding for generic audiovisual services," Mar. 2010, 669 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Kim, et al., "CE2: Test results of asymmetric motion partition (AMP)" Source: Samsung Electronics Co., Ltd., JCTVC-F379, ITU-T SG16 WP3 and ISO/IEC JTC1/SC29/WG11, 6th Meeting: Torino, IT, Jul. 14-22, 2011, 10 pp.

Lai (Hisilicon / Huawei) et al., "New intraprediction using the correlation between pixels and lines"., JCT-VC Meeting; Apr. 15-23, 2010; Dresden; (Jointcollaborative Team on Video Coding of ISO/IEC JTC1/SC29/WG11 and ITU-TSG.16 ); URL: http://wftp3.itu.int/av-arch/jctvc-site/, XP030007513, ISSN: 0000-0049, 10 pp.

Narroschke, et al., "Decisions for deblocking", Mar. 10, 2011, No. JCTVC-E251, Mar. 16-23, 2011, XP030008757, ISSN: 0000-0007, 11 pp.

Peterfreund, et al., Text Modifications to MB-AFF Quantization and MB-AFF interaction with deblocking filter, Joint Video Team (JVT) of ISO/IEC MPEG & ITU-I VCEG(ISCVIEC JTCI/SC29ANGII ANDITU-T SG16 06), No. JVT-E162, Oct. 9-17, 2002, XP030005575, 224 pp.

Norkin et al., "Description of Core Experiment 12: Deblocking filtering", JCT-VC Meeting; MPEG Meeting; Jul. 14-22, 2011; Torino; (Joint Collaborative Team on Video Coding of ISO/IEC JTC1/SC29/WG11 and ITU-T SG. 16); URL: http://wftp3.itu.int/av-arch/jctvc-site/., No. JCTVC-F912, XP030009813, 15 pp.

Reply to Written Opinion Dated Aug. 2, 2012, from International Application No. PCT/US2012/037113, Filed Feb. 7, 2013, 25 pp.

Second Written Opinion from International Patent Application No. PCT/US2012/037113, Dated Apr. 8, 2013, 7 pp.

Shi et al., "CE12, Subset 1: Report of Deblocking for Large Size Blocks", JCT-VC Meeting; MPEG Meeting; Jul. 14-22, 2011; Torino; (Joint Collaborative Team on Video Coding of ISO/IEC JTC1/SC29/WG11 and ITU-T SG. 16 ); URL: http://wftp3.itu.int/av-arch/jctvc-site/., No. JCTVC-F198, XP030009221, 7 pp.

Van Der Auwera G et al., "CE12 Subtest1: Deblocking o f New Non-Square Blocks: Edge Shift for AMP", JCT-VC Meeting; MPEG Meeting; Nov. 21-30, 2011; Geneva; (Jointcollaborative Team on Video Coding of ISO/IEC JTC1/SC29/WG11 and ITU-T 56.16); URL: http://wftp3.itu.int/av-arch/jctvc site/., No. JCTVC-G383, XP030110367, 4 pp.

Wiegand et al., "WD3: Working Draft 3 of High-Efficiency Video Coding," Document JCTVC-E603, 5th Meeting: Geneva, CH, Mar. 16-23, 2011, 193 pp.

Wiegand et al., "WD1: Working Draft 1 of High-Efficiency Video Coding", JCTVC-C403, 3rd Meeting: Guangzhou, CN, Oct. 7-15, 2010, 137 pp.

Yi, F. et al., "Low-Complexity Tools in AVS Part 7", Journal of Computer Science and Technology, May 1, 2006, pp. 345-353, vol. 21, No. 3, Kluwer Academic Publishers, XP019411313, ISSN: 1860-4749, DOI: 10.1007/S11390-006-0345-9.

Yuan, et al., "CE2: Non-Square Quadtree Transform for symmetric and asymmetric motion partition," JCTVC-F410. Joint Collaborative Team on Video Coding (JCT-VC) of ITU-T SG16 WP3 and ISO/IEC JTC1/SC29/WG11 6th Meeting: Torino, IT, Jul. 14-22, 2011, 6 pp.

Zhai, et al., "Efficient Quadtree Based Block-Shift Filtering for Deblocking and Deringing," J. Vis. Comun. Image Represent. 20, Nov. 8, 2009, pp. 595-607.

Bross, B. et al., "WD5: Working Draft 5 of High-Efficiency Video Coding," Joint Collaborative Team on Video Coding, Document: JCTVC-G1103, Nov. 21-30, 2011, 214 pp.

Cao, X. et al., "CE6.b1 Report on Short Distance Intra Prediction Method," Joint Collaborative Team on Video Coding, Document: JCTVC-E278, Mar. 16-23, 2011, 7 pp.

Cao, X. et al., "CE6.b Report on Short Distance Intra Prediction Method," Joint Collaborative Team on Video Coding, PowerPoint: JCTVC-E278, Mar. 6, 2011, 16 pp.

Wiegand, T. et al., "WD2: Working Draft 2 of High-Efficiency Video Coding," Joint Collaborative Team on Video Coding, Document: JCTVC-D503, Jan. 20-28, 2011, 153 pp.

Yang et al., "CE12 Subset1: SKT/SKKU Deblocking Filter," Joint Collaborative Team on Video Coding (JCT-VC) of ITU-T SG16 WP3 and ISO/IEC JTC1/SC29/WG11 5th Meeting: Geneva, CH, JCTVC-E417, Mar. 16-23, 2011, 5 pp.

Yang et al., "CE8 subset1: Results of intra deblocking filter testing by SKKU/SKT (JCTVC-C130)," Joint Collaborative Team on Video Coding (JCT-VC) of ITU-T SG16 WP3 and ISO/IEC JTC1/SC29/WG11 4th Meeting: Daegu, KR, JCTVC-D334, Jan. 20-28, 2011, 5 pp.

Yang et al., "CE8 Subtest1: Results of intra deblocking filter testing by SKKU/SKT," JCTVC-D334 Proposal PowerPoint, Jan. 26, 2011, 16 pp.

* cited by examiner

| $p7_0$ | $p6_0$ | $p5_0$ | $p4_0$ | $p3_0$ | $p2_0$ | $p1_0$ | $p0_0$ | $q0_0$ | $q1_0$ | $q2_0$ | $q3_0$ | $q4_0$ | $q5_0$ | $q6_0$ | $q7_0$ |
|---|---|---|---|---|---|---|---|---|---|---|---|---|---|---|---|
| $p7_1$ | $p6_1$ | $p5_1$ | $p4_1$ | $p3_1$ | $p2_1$ | $p1_1$ | $p0_1$ | $q0_1$ | $q1_1$ | $q2_1$ | $q3_1$ | $q4_1$ | $q5_1$ | $q6_1$ | $q7_1$ |
| $p7_2$ | $p6_2$ | $p5_2$ | $p4_2$ | $p3_2$ | $p2_2$ | $p1_2$ | $p0_2$ | $q0_2$ | $q1_2$ | $q2_2$ | $q3_2$ | $q4_2$ | $q5_2$ | $q6_2$ | $q7_2$ |
| $p7_3$ | $p6_3$ | $p5_3$ | $p4_3$ | $p3_3$ | $p2_3$ | $p1_3$ | $p0_3$ | $q0_3$ | $q1_3$ | $q2_3$ | $q3_3$ | $q4_3$ | $q5_3$ | $q6_3$ | $q7_3$ |
| $p7_4$ | $p6_4$ | $p5_4$ | $p4_4$ | $p3_4$ | $p2_4$ | $p1_4$ | $p0_4$ | $q0_4$ | $q1_4$ | $q2_4$ | $q3_4$ | $q4_4$ | $q5_4$ | $q6_4$ | $q7_4$ |
| $p7_5$ | $p6_5$ | $p5_5$ | $p4_5$ | $p3_5$ | $p2_5$ | $p1_5$ | $p0_5$ | $q0_5$ | $q1_5$ | $q2_5$ | $q3_5$ | $q4_5$ | $q5_5$ | $q6_5$ | $q7_5$ |
| $p7_6$ | $p6_6$ | $p5_6$ | $p4_6$ | $p3_6$ | $p2_6$ | $p1_6$ | $p0_6$ | $q0_6$ | $q1_6$ | $q2_6$ | $q3_6$ | $q4_6$ | $q5_6$ | $q6_6$ | $q7_6$ |
| $p7_7$ | $p6_7$ | $p5_7$ | $p4_7$ | $p3_7$ | $p2_7$ | $p1_7$ | $p0_7$ | $q0_7$ | $q1_7$ | $q2_7$ | $q3_7$ | $q4_7$ | $q5_7$ | $q6_7$ | $q7_7$ |

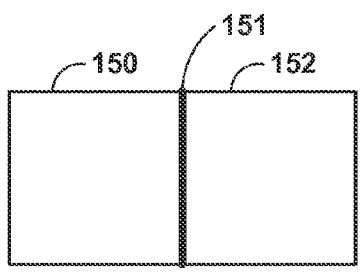
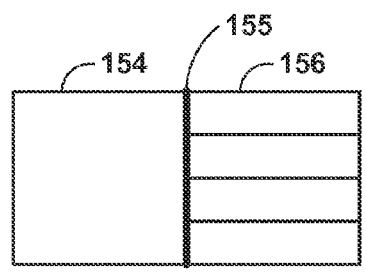
FIG. 7A             FIG. 7B
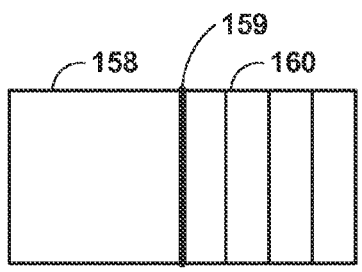
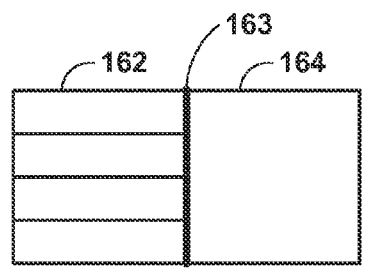
FIG. 7C             FIG. 7D
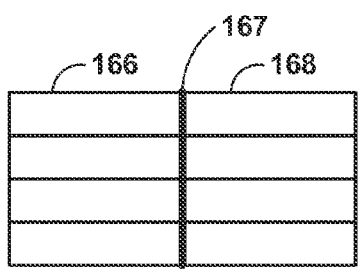
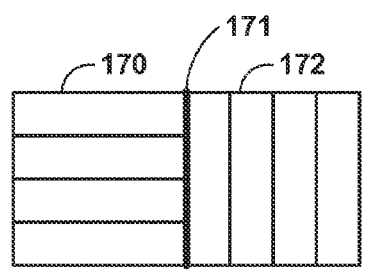
FIG. 7E             FIG. 7F
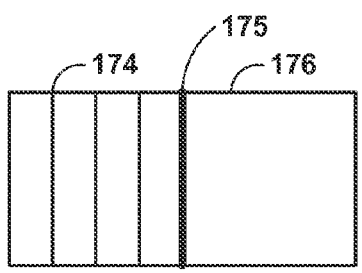
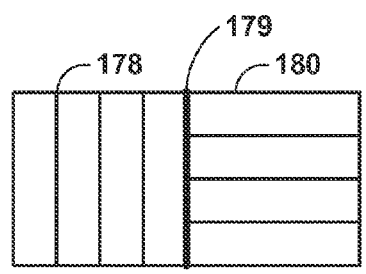
FIG. 7G             FIG. 7H
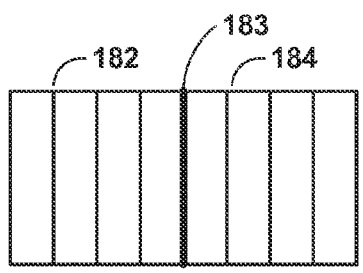
FIG. 7I

FILTERING BLOCKINESS ARTIFACTS FOR VIDEO CODING

This application claims priority to U.S. Provisional Application No. 61/485,442, filed May 12, 2011, U.S. Provisional Application No. 61/492,761, filed Jun. 2, 2011, U.S. Provisional Application No. 61/499,563, filed Jun. 21, 2011, and 61/506,938, filed Jul. 12, 2011 each of which is hereby incorporated by reference in its respective entirety.

TECHNICAL FIELD

This disclosure relates to video coding, and more particularly, to deblocking video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into blocks. Each block can be further partitioned. Blocks in an intra-coded (I) frame or slice are encoded using spatial prediction with respect to neighboring blocks. Blocks in an inter-coded (P or B) frame or slice may use spatial prediction with respect to neighboring blocks in the same frame or slice or temporal prediction with respect to other reference frames.

SUMMARY

In general, this disclosure describes techniques for deblocking edges between video blocks based at least in part on whether either of the blocks is predicted using short distance intra prediction (SDIP). The techniques of this disclosure may improve deblocking decisions and deblocking functions applied to such edges. Likewise, the techniques of this disclosure may avoid excess processing of edges and dramatic increases in storage requirements when processing edges for deblocking.

In one example, a method includes determining a first prediction mode for a first block of video data and a second prediction mode for a second block of video data, wherein the first block and the second block share a common edge, decoding the first block using the first prediction mode and the second block using the second prediction mode, and determining whether to deblock the common edge between the first block and the second block based at least in part on whether at least one of the first prediction mode and the second prediction mode comprises short distance intra-prediction (SDIP).

In another example, an apparatus includes a video coder configured to determine a first prediction mode for a first block of video data and a second prediction mode for a second block of video data, wherein the first block and the second block share a common edge, decode the first block using the first prediction mode and the second block using the second prediction mode, and determine whether to deblock the common edge between the first block and the second block based at least in part on whether at least one of the first prediction mode and the second prediction mode comprises short distance intra-prediction (SDIP).

In another example, an apparatus includes means for determining a first prediction mode for a first block of video data and a second prediction mode for a second block of video data, wherein the first block and the second block share a common edge, means for decoding the first block using the first prediction mode and the second block using the second prediction mode, and means for determining whether to deblock the common edge between the first block and the second block based at least in part on whether at least one of the first prediction mode and the second prediction mode comprises short distance intra-prediction (SDIP).

In another example, a computer program product includes a computer-readable medium having stored thereon instructions that, when executed, cause one or more processors of a device for coding video data to determine a first prediction mode for a first block of video data and a second prediction mode for a second block of video data, wherein the first block and the second block share a common edge, decode the first block using the first prediction mode and the second block using the second prediction mode, and determine whether to deblock the common edge between the first block and the second block based at least in part on whether at least one of the first prediction mode and the second prediction mode comprises short distance intra-prediction (SDIP).

The details of one or more examples are set forth in the accompanying drawings and the description below. Other features, objects, and advantages will be apparent from the description and drawings, and from the claims.

BRIEF DESCRIPTION OF DRAWINGS

FIG. 6 is a conceptual diagram illustrating pixel positions of two example blocks near an edge between the blocks.

FIGS. 7A-7I are conceptual diagrams illustrating various SDIP prediction unit (PU) orientations relative to an edge between two blocks.

DETAILED DESCRIPTION

Figure 1:
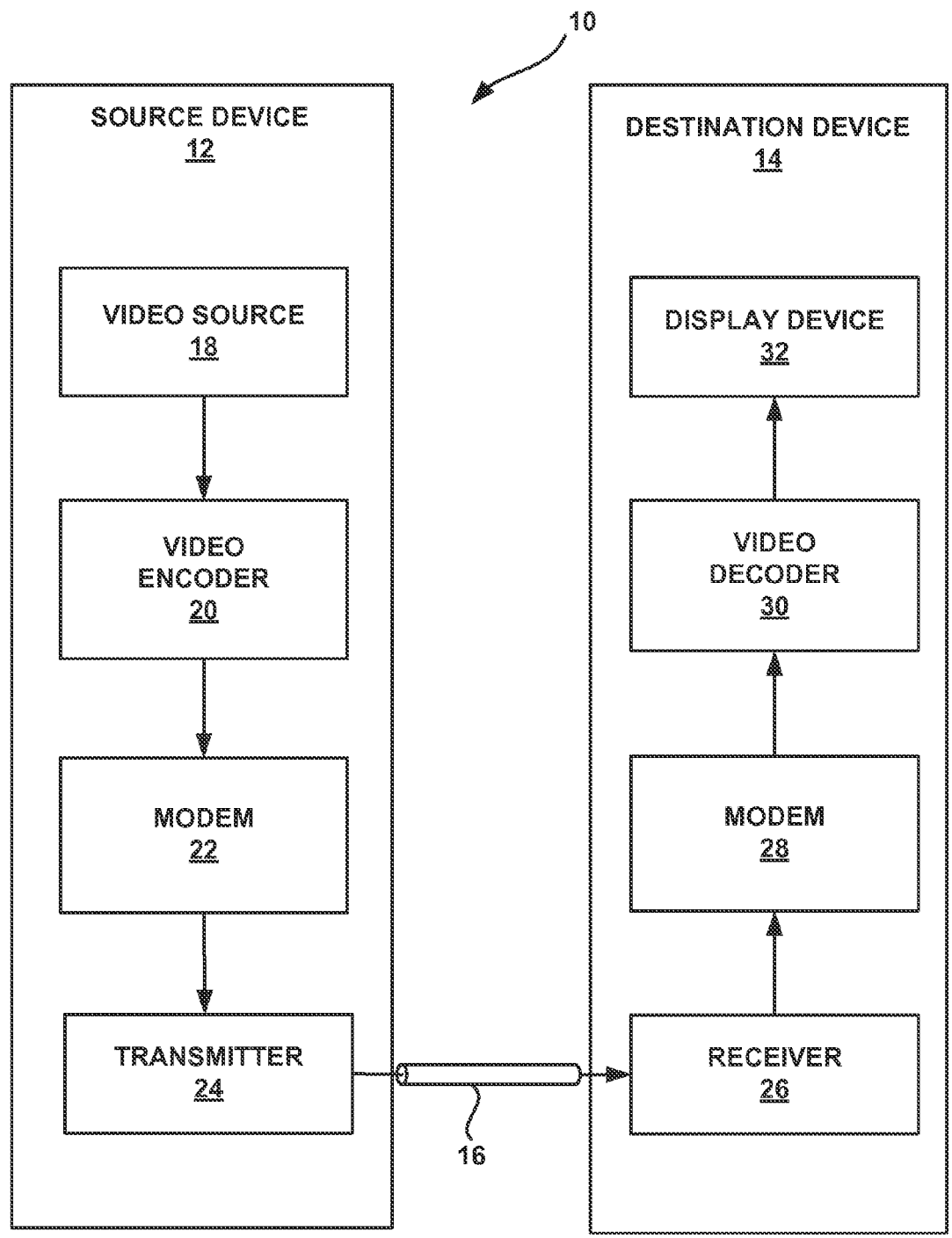
FIG. 1 is a block diagram illustrating an example video encoding and decoding system that may utilize techniques for determining whether to apply a deblocking filter to an edge between two coding units (CUs) based at least in part whether the CUs are predicted using short distance intra-prediction (SDIP).

In general, video data includes a sequence of frames, which may be coded in an intra-prediction mode or an inter-prediction mode. The frames may be divided into blocks of video data and an encoding mode may be selected for each block. In inter-prediction modes, the blocks may be predicted relative to data of one or more previously coded frames. In intra-prediction modes, the blocks may be predicted relative to one or more neighboring, previously coded blocks of the same frame.

In accordance with the upcoming High Efficiency Video Coding (HEVC) standard, frames may be divided into largest coding units (LCUs), which may comprise, for example, 32×32 pixel blocks or 64×64 pixel blocks. In general, LCUs may be partitioned into sub-coding units (sub-CUs), each of which may be further partitioned. In general, the term coding unit (CU) may refer to an LCU or any sub-CU thereof (e.g., a sub-CU of an LCU or a sub-CU of another sub-CU). CUs may be partitioned into four square, non-overlapping blocks. An LCU may correspond to a quadtree data structure that includes one or more nodes, where a root node of the quadtree corresponds to the LCU itself and other nodes correspond to sub-CUs of the LCU. An unpartitioned CU generally corresponds to a leaf node of the quadtree (that is, a node of the quadtree that does not have any child nodes). Accordingly, an unpartitioned CU may be referred to as a leaf-node CU. Leaf node CUs generally include one or more prediction units (PUs) that describe how data for the CU is predicted, and one or more transform units (TUs) which correspond to residual data, that is, pixel-by-pixel differences between predicted data for the CU and original data for the CU.

A leaf node for an unpartitioned CU may include information indicating prediction modes for PUs of the CU. In some examples, a residual quadtree (RQT) (also referred to as a TU quadtree) may be provided for leaf-node CUs, where the RQT may include information indicating prediction modes for TUs of the corresponding leaf-node CU. In any case, information for a CU may indicate prediction modes for one or more portions of the CU. With respect to intra-prediction modes, for example, the information may indicate whether a DC prediction mode is used, or whether a direction intra-prediction mode is used. In the DC prediction mode, values for neighboring pixels of previously coded blocks may be aggregated and used to form predicted values for pixels of the current CU. In directional prediction modes, values for neighboring pixels of previously coded blocks may be applied in a particular direction to form predicted values for pixels of the current CU.

The a video coder, such as a video encoder or video decoder, may provide short-distance intra-prediction (SDIP) modes for use in coding intra-predicted blocks. SDIP generally allows a CU to be divided into parallel PUs. That is, the PUs of an SDIP-partitioned CU may either have lengths that are longer than their widths, or widths that are longer than their lengths. Moreover, portions of the CU corresponding to the PUs may be predicted from portions of the same CU. For example, an 8×8 CU may be divided into four 8×2 PUs, where "N×M" refers to N pixels vertically and M pixels horizontally, in this example. The first PU may be predicted from neighboring pixels to the CU, the second PU may be predicted from neighboring pixels including pixels of the first PU, the third PU may be predicted from neighboring pixels including pixels of the second PU, and the fourth PU may be predicted from neighboring pixels including pixels of the third PU. In this manner, rather than predicting all pixels of the CU from pixels of neighboring, previously coded blocks to the CU, pixels within the CU may be used to predict other pixels within the same CU, using SDIP. SDIP PUs may be considered "short" in that the PUs may be non-square and may have fewer than four pixels in one direction.

The HM also provides for de-blocking using de-blocking filters to remove "blockiness" artifacts. That is, after dividing a frame into blocks (LCUs and sub-CUs thereof), coding the blocks, and then decoding the blocks, perceptible artifacts at edges between the blocks may occur. Therefore, video encoders may encode video data of a frame, then subsequently decode the encoded video data, and then apply deblocking filters to the decoded video data to produce reference video data, e.g., for inter-prediction of subsequently coded video data. Such deblocking filtering performed by a video coding device, such as a video encoder or video decoder, prior to storing the data for use as reference data, e.g., in a reference picture buffer, is generally referred to as "in-loop" filtering, in that the filtering is performed within the coding loop. Video decoders may be configured to decode received video data, and then apply the same deblocking filters to the decoded video data, for purposes of displaying the video data as well as for use as reference data for subsequent video data to be decoded. By configuring both encoders and decoders to apply the same deblocking techniques, the encoders and decoders can be synchronized, such that deblocking does not introduce error for subsequently coded video data using the deblocked video data for reference.

The HM is generally configured to determine, for each edge separating two PUs or TUs, whether to apply a deblocking filter to deblock the edge. The HM may be configured to determine whether to deblock an edge based on an analysis of one or more lines of pixels perpendicular to the edge, e.g., a line of 8 pixels. Thus, for example, for a vertical edge, the HM may determine whether to deblock the edge by examining four pixels to the left and four pixels to the right of the edge along a common line, which may be horizontal or vertical. The number of pixels selected generally corresponds to the smallest block for deblocking, e.g., 8×8 pixels. In this manner, the line of pixels used for analysis may enter only two PUs or TUs, namely the PUs or TUs immediately to the left and to the right of an edge. The line of pixels used for analysis of whether to perform deblocking for an edge is also referred to as a set of support pixels, or simply "support."

Video coding devices may be configured to execute deblocking decision functions relative to the support for a particular edge. In general, deblocking decision functions are configured to detect high-frequency changes within the support. Typically, when a high frequency change is detected, the deblocking decision function provides an indication that deblocking should occur. However, with the introduction of SDIP, the support pixels used for analysis may cross multiple PU boundaries, i.e., due to the reduced size of the adjacent SDIP PU's. Therefore, a deblocking decision function may provide an improper indication that an edge between two blocks, at least one of which is predicted using SDIP, should be deblocked. For example, the deblocking decision function may detect a high frequency change within the set of support pixels when analyzing an edge, but the high frequency change may occur at a boundary between two PUs or TUs, rather than at the edge currently being considered.

The techniques of this disclosure are generally directed to determining whether to deblock an edge between two video blocks, e.g., two CUs, based at least in part on whether one or both of the blocks is predicted using SDIP. In some examples, when the set of support pixels crosses one or more SDIP PU edges, deblocking is simply skipped. In other examples, the decision of whether to perform deblocking may be made using alternative support regions, which may be selected such that the support regions do not cross SDIP PU edges. For example, the distance (in pixels) between SDIP PU edges may be mapped to an adapted support region, such that the adapted support region spans a reduced number of pixels and therefore does not cross the SDIP PU edges. As another example, the SDIP PU types in the neighborhood of the current edge may be mapped to an adapted support region that does not cross the SDIP PU edges.

SDIP PUs may generally be considered to have either a horizontal orientation or a vertical orientation. A PU may be considered to be horizontally oriented when its horizontal section is longer than its vertical section, e.g., its width is longer than its height. A PU may be considered to be vertically oriented when its vertical section is longer than its horizontal section, e.g., its height is longer than its width. Thus, a PU that has two pixels horizontally and eight pixels vertically would be considered vertically oriented, while a PU that has two pixels vertically and eight pixels horizontally would be considered horizontally oriented. Moreover, a set of support pixels may be considered parallel with a PU when the set of support pixels lie along a line that is parallel to the orientation of the PU, and a set of support pixels may be considered perpendicular to a PU when the set of support pixels lie along a line that is perpendicular to the orientation of the PU.

In some examples, the techniques of this disclosure include determining, in addition to whether either or both blocks sharing a common edge are predicted using SDIP, whether the SDIP partitions are perpendicular to the common edge between the blocks. In general, if all SDIP partitions are perpendicular to the common edge for which a deblocking determination is being made, then the analysis need not change from conventional deblocking determinations. That is, because the line of support pixels runs parallel to the SDIP partitions in these situations, the standard set of support pixels will not cross an SDIP boundary, and thus, lead to a correct determination of whether to deblock the common edge. Even in cases where the SDIP partitions are parallel to the common edge, the conventional set of support pixels may not cross SDIP partition boundaries (e.g., when the SDIP partition widths are wider than the set of support pixels on one side of the common edge). Therefore, the video coding device may, in accordance with the techniques of this disclosure, determine whether the support pixels will cross one or more SDIP partition boundaries, and if so, modify the process of determining whether to deblock the common edge (e.g., using adaptive support).

This disclosure also provides data structures for storing indications of locations of edges in an LCU. In some examples, a video coding device forms a decoded LCU from prediction data and decoded residual data for sub-CUs of the LCU and then executes a deblocking decision function relative to the LCU. The video coding device may determine locations of edges in the LCU based on partitioning of the LCU into sub-CUs, where edges are generally formed between two neighboring CUs. Accordingly, the video coding device may store locations of candidate edges in a data structure for the LCU. The deblocking decision function executed by the video coding device may analyze each edge in the LCU (that is, boundaries between any two blocks in the LCU) to determine whether to deblock the edges. That is, the deblocking decision function may use the data structure to determine locations of candidate edges, determine whether to deblock the candidate edges, and then deblock the determined edges.

In accordance with the techniques of this disclosure, rather than simply storing binary determinations for each candidate edge (that is, whether there is or is not an edge in the corresponding location of the LCU), the video coding device may store indications of SDIP prediction modes (e.g., SDIP partition sizes and directions) in the data structure. After storing values to the data structure, a deblocking process executed by the video coding device may use the data structure to determine what, if any, edges to deblock in the LCU. In other examples, the video coding device may perform similar techniques relative to all LCUs (and sub-CUs thereof) in a slice or a frame of video data.

FIG. 1 is a block diagram illustrating an example video encoding and decoding system 10 that may utilize techniques for determining whether to apply a deblocking filter to an edge between two CUs based at least in part whether the CUs are predicted using SDIP. As shown in FIG. 1, system 10 includes a source device 12 that transmits encoded video to a destination device 14 via a communication channel 16. Source device 12 and destination device 14 may comprise any of a wide range of devices. In some cases, source device 12 and destination device 14 may comprise wireless communication devices, such as wireless handsets, so-called cellular or satellite radiotelephones, or any wireless devices that can communicate video information over a communication channel 16, in which case communication channel 16 is wireless.

The techniques of this disclosure, however, which concern determining whether to apply a deblocking filter to an edge between CUs based at least in part whether the CUs are predicted using SDIP, are not necessarily limited to wireless applications or settings. For example, these techniques may apply to over-the-air television broadcasts, cable television transmissions, satellite television transmissions, Internet video transmissions, encoded digital video that is encoded onto a storage medium, or other scenarios. Accordingly, communication channel 16 may comprise any combination of wireless, wired, or storage media suitable for transmission or storage of encoded video data.

In the example of FIG. 1, source device 12 includes a video source 18, video encoder 20, a modulator/demodulator (modem) 22 and a transmitter 24. Destination device 14 includes a receiver 26, a modem 28, a video decoder 30, and a display device 32. In accordance with this disclosure, video encoder 20 of source device 12 may be configured to apply the techniques for determining whether to apply a deblocking filter to an edge between CUs based at least in part whether the CUs are predicted using SDIP. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for determining whether to apply a deblocking filter to an edge between CUs based at least in part whether the CUs are predicted using SDIP may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be modulated by modem 22 according to a communication standard, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

Receiver 26 of destination device 14 receives information over channel 16, and modem 28 demodulates the information. Again, the video encoding process may implement one or more of the techniques described herein to determine whether to apply a deblocking filter to an edge between CUs based at least in part whether the CUs are predicted using SDIP. The information communicated over channel 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. In other examples, coded video data may be stored to a storage medium and physically transported to a destination device, which may read and decode the coded video data from the storage medium. Communication channel 16 may form part of a packet-based network, such as a local area network, a wide-area network, or a global network such as the Internet.

Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14. In other examples, source device 12 may store encoded data onto a storage medium, rather than transmitting the data. Likewise, destination device 14 may be configured t retrieve encoded data from a storage medium.

Video encoder 20 and video decoder 30 may operate according to a video compression standard, such as the upcoming High Efficiency Video Coding (HEVC) standard. The techniques of this disclosure, however, are not limited to any particular coding standard. Other examples include ITU-T H.264 standard, alternatively referred to as MPEG-4, Part 10, Advanced Video Coding (AVC), MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC. Similar to the JVT, VCEG and MPEG have established the Joint Collaborative Team on Video Coding (JCT-VC) for developing HEVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. Each of video encoder 20 and video decoder 30 may be included in one or more encoders or decoders, either of which may be integrated as part of a combined encoder/decoder (CODEC) in a respective camera, computer, mobile device, subscriber device, broadcast device, set-top box, server, or the like.

A video sequence typically includes a series of video frames. A group of pictures (GOP) generally comprises a series of one or more video frames. A GOP may include syntax data in a header of the GOP, a header of one or more frames of the GOP, or elsewhere, that describes a number of frames included in the GOP. Each frame may include frame syntax data that describes an encoding mode for the respective frame. Video encoder 20 typically operates on video blocks within individual video frames in order to encode the video data. A video block may correspond to a macroblock or a partition of a macroblock, or an LCU, a CU or partition of a CU (e.g., a sub-CU). The video blocks may have fixed or varying sizes, and may differ in size according to a specified coding standard. Each video frame may include a plurality of slices. Each slice may include a plurality of blocks, which may be arranged into partitions, also referred to as sub-blocks. In HEVC, for example, largest coding units (LCUs) and sub-coding units (CUs) thereof may be partitioned according to a quadtree data structure.

As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16×16, 16'8, 8'16, 8'8, 8'4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Block sizes that are less than 16 by 16 may be referred to as partitions of a 16 by 16 macroblock. Video blocks may comprise blocks of pixel data in the pixel domain, or blocks of transform coefficients in the transform domain, e.g., following application of a transform such as a discrete cosine transform (DCT), an integer transform, a wavelet transform, or a conceptually similar transform to the residual video block data representing pixel differences between coded video blocks and predictive video blocks. In some cases, a video block may comprise blocks of quantized transform coefficients in the transform domain.

Smaller video blocks can provide better resolution, and may be used for locations of a video frame that include high levels of detail. In general, blocks and the various partitions, sometimes referred to as sub-blocks, may be considered video blocks. In addition, a slice may be considered to be a plurality of video blocks, such as blocks and/or sub-blocks, or LCUs and/or sub-CUs. Each slice may be an independently decodable unit of a video frame. Alternatively, frames themselves may be decodable units, or other portions of a frame may be defined as decodable units. The term "coded unit" or "coding unit" may refer to any independently decodable unit of a video frame such as an entire frame, a slice of a frame, a group of pictures (GOP) also referred to as a sequence, or another independently decodable unit defined according to applicable coding techniques.

The HEVC test model (HM) describes a hypothetical device implemented according to the techniques of HEVC. The HM may be configured with short distance intra prediction (SDIP) prediction modes. In SDIP, a video coding device may partition a block (e.g., a leaf-node CU) into a number of parallel prediction units (PUs). For example, the HM may partition a 16×16 CU into four 4×16 or four 16×4 PUs that are predicted using SDIP. For SDIP, the video coding device predicts a first one of the PUs from values for neighboring pixels of a previously coded block to the current CU.

After coding the region of the CU corresponding to the first PU, the video coding device predicts a next one of the PUs of the current CU from neighboring pixels of the previously coded PU of the current CU. Thus, rather than using pixels exclusively from previously coded CUs as reference pixels for intra-prediction, in SDIP, pixels within the same CU may be used as reference pixels for other pixels of the CU. Of course, depending on the intra-prediction direction, pixels of previously coded CUs may also be used for reference in calculating predicted values for a current PU of the current CU as well as pixels of a previously coded PU of the current CU. Pixel values are also referred to as "samples" in the upcoming HEVC standard, which refers to luminance or "luma" samples and chrominance or "chroma" samples.

The in-loop deblocking algorithm included in the test model of HEVC computes decisions and performs filtering on the basis of a smallest block for deblocking, for example of size 8×8 pixels. The deblocking decisions and filters for processing the edges of the smallest block are typically formed such that there is no overlap with other edges of PUs or TUs besides the edge being processed. This is because the decision and filtering results may become unreliable when other edges are crossed and pixels from other edge neighborhoods are used in the computations.

Various SDIP PU partitioning schemes may be provided, e.g., based on the size of the current CU. In general, SDIP PUs for an N×N CU may have sizes of (N/4)×N or N×(N/4), where N is an integer greater than or equal to 4. Other sizes and partitioning schemes may also be available, e.g., N×1 or 1×N for an N×N CU. Table 1 below provides several example partitioning schemes that may be available for constructing SDIP PUs based on the size of the current CU. SDIP PUs of HEVC may have various rectangular sizes per CU. Several of the PUs have a dimension which is smaller than the smallest block size for deblocking. For example, PU sizes 1×16, 16×1, 2×8, 8×2 may cause deblocking decisions and filters having eight taps (four taps on either side of the edge) to cross one or several SDIP PU edges within the smallest block for deblocking, which should be avoided.

TABLE 1

| CU Size | PU Sizes Available |
|---------|--------------------|
| 32 × 32 | 8 × 32, 32 × 8 |
| 16 × 16 | 4 × 16, 16 × 4, 1 × 16, 16 × 1 |
| 8 × 8   | 2 × 8, 8 × 2 |

Video encoder 20 and video decoder 30 may be configured to perform SDIP. Moreover, video encoder 20 and video decoder 30 may be configured to perform in-loop filtering for purposes of deblocking. In general, deblocking includes analyzing sets of pixels on either side of an edge dividing two blocks (e.g., two CUs) to detect a high-frequency change at the edge. When such a high frequency change is detected, the edge may be deblocked. For example, values of the pixels near the edge may be smoothed to reduce the high frequency change, thereby reducing the appearance of "blockiness" artifacts in video data that is ultimately displayed.

In HEVC, to detect the high-frequency change at an edge between two CUs, three pixels in a row on each side of the edge, and two pixels making up the edge, are analyzed, for a total of eight pixels. A deblocking decision function may apply respective coefficients to the values of the pixels being analyzed, generally referred to as support pixels. Conventionally, the smallest block size available has been 4×4 pixels, and therefore, the set of support pixels on either side of the edge would always be within the block. However, with the introduction of SDIP, the set of support pixels may cross SDIP PU boundaries, e.g., when the SDIP PU sizes are 1×16, 16×1, 2×8, 8×2 or any other SDIP PU size having less than four pixels in one direction (when the set of support pixels is four pixels in a given block).

High frequency changes may occur at the boundaries between two SDIP PUs. In some cases, this may lead to a false positive for a deblocking decision function. For example, there may not actually be a high frequency change at the boundary between two CUs, but at the boundary between two PUs of one of the two CUs. When the set of support pixels crosses the boundary between the two PUs, however, the deblocking decision function may detect the presence of a high frequency change, albeit at the boundary between the two PUs rather than the two CUs. This may lead to erroneous processing of the pixels near the edge between the two CUs.

In accordance with the techniques of this disclosure, video encoder 20 and video decoder 30 may be configured to determine whether to deblock an edge between two CUs based at least in part on whether either or both of the CUs are predicted using SDIP. In general, video encoder 20 and video decoder 30 may be configured to perform in-loop deblocking filtering. That is, reference data (such as previously coded blocks for intra-prediction or previously coded frames or slices for inter-prediction) may be deblocked prior to use as reference data. Accordingly, when video encoder 20 deblocks a particular edge, video decoder 30 should also deblock that edge. Moreover, the techniques used by video encoder 20 and video decoder 30 are essentially the same. Therefore, references to a "video coding device" may generally refer to either a video encoder, such as video encoder 20, or to a video decoder, such as video decoder 30. For purposes of explanation, the techniques of this disclosure are described primarily with respect to video encoder 20 below, but it should be understood that video decoder 30 may be configured to perform substantially similar techniques.

Following intra-predictive or inter-predictive coding to produce predictive data and residual data, and following any transforms (such as the 4×4 or 8×8 integer transform used in H.264/AVC or a discrete cosine transform DCT) to produce transform coefficients, quantization of transform coefficients may be performed. Quantization generally refers to a process in which transform coefficients are quantized to possibly reduce the amount of data used to represent the coefficients. The quantization process may reduce the bit depth associated with some or all of the coefficients. For example, an n-bit value may be rounded down to an m-bit value during quantization, where n is greater than m.

Following quantization, entropy coding of the quantized data may be performed, e.g., according to content adaptive variable length coding (CAVLC), context adaptive binary arithmetic coding (CABAC), or another entropy coding methodology. A processing unit configured for entropy coding, or another processing unit, may perform other processing functions, such as zero run length coding of quantized coefficients and/or generation of syntax information such as coded block pattern (CBP) values, block type, coding mode, maximum macroblock size for a coded unit (such as a frame, slice, macroblock, or sequence), or the like.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Video encoder 20 decodes substantially all encoded video data, e.g., by inverse quantizing and inverse transforming residual data and combining the residual data with prediction data for a particular CU. After this decoding process, video encoder 20 may determine whether to deblock edges between CUs. Following deblocking, video encoder 20 may store the decoded data in a memory, such as a decoded picture buffer, for use as reference data. That is, when predicting subsequent video data, of the same frame or different frames, video encoder 20 may use the stored data in the memory as reference for predicting the subsequent data in either an intra-prediction mode or an inter-prediction mode. Because deblocking filtering is performed after decoding and prior to storing the data for use as reference, the deblocking filtering may be referred to as "in-loop" filtering, in that the filtering is performed during the coding loop. Accordingly, video encoder 20 and video decoder 30 may be configured according to the same deblocking techniques, such that when video encoder 20 encodes video data, video decoder 30 is able to accurately decode the video data.

In some examples, video encoder 20 determines that, for any edge between two SDIP-predicted CUs, the edge should not be deblocked. That is, video encoder 20 may skip application of the deblocking decision function to all edges between two CUs, at least one of which is predicted using SDIP. In other examples, video encoder 20 may be configured to skip application of the deblocking decision function to an edge between two CUs when at least one of the CUs is predicted using an SDIP prediction mode having PUs that are parallel to the edge. On the other hand, when either or both of the CUs are predicted using SDIP PUs that are perpendicular to the edge, video encoder 20 may apply the deblocking determination function as normal. That is, when the SDIP PUs are perpendicular to the edge, the support pixels used to determine whether to deblock the edge run in a line that is parallel to the boundaries between the SDIP PUs, and therefore, will not cross the boundaries between SDIP PUs. Therefore, in this situation, there is not a risk that the support pixels will cross an SDIP PU boundary and thereby present a false positive, so video encoder 20 may apply the deblocking determination function without concern for such problems.

In other examples, video encoder 20 may include definitions of alternative support regions to apply when at least one of the CUs is predicted using SDIP. The alternative support regions may be constructed such that the support does not cross SDIP PU boundaries. Suppose, for example, that for two neighboring CUs, one of the two CUs is predicted using SDIP having PUs of 8×2, and the other is predicted using a conventional intra-prediction mode (other than SDIP). The support region may then include four pixels of the CU predicted using the conventional intra-prediction mode, and two pixels of the SDIP-predicted CU. As another example, suppose both CUs are predicted using SDIP PUs of 8×2 pixels. In this example, the adaptive support region may include two pixels from each of the CUs, for a total of four pixels. The adaptive support regions may be selected based on an SDIP PU type, or on a distance (in pixels) between the SDIP PU edges and the current edge between the CUs.

The in-loop deblocking implementation in the HEVC test model processes the TUs and PUs included in the current CU in order to determine edges to be deblocked. Conventionally, the edge filtering status is stored as a Boolean value in a multi-dimensional edge filtering array. The elements of the edge filtering array may correspond to non-overlapping 4×4 pixel blocks within the CU. For each of the vertical and horizontal edge directions of the left and top boundaries of the 4×4 blocks, the array may include a Boolean value to indicate whether the edge is a candidate for deblocking. The 4×4 pixel size of the blocks in the array is related to the memory requirement to store the edge filtering array. Alternatively, an edge filtering array with elements corresponding to smaller or larger block sizes can be stored, resulting in larger or smaller memory requirements, respectively.

With respect to SDIP, several partitions have dimensions which are smaller than the 4×4 block size corresponding to elements in the edge filtering array. For example, the edges of partition sizes 1×16, 16×1, 2×8, and 8×2 cannot be uniquely represented in the edge filtering array based on 4×4 block sizes. In order to store the edge filtering status of these SDIP partitions, the memory requirements of the edge filtering array would need to be increased by using elements that correspond to, for example, 2×2 blocks. While this is a possible solution, this disclosure includes alternative solutions as well.

In some examples, video encoder 20 may be configured to store indications of candidate edges for analysis in a data structure, such as the edge filtering array described above. For example, video encoder 20 may analyze all CUs of a particular LCU and determine locations of edges between neighboring CUs of the LCU. Video encoder 20 may store determinations of locations of the edges in a data structure, such as an array, a linked-list, a tree structure, or other data structure. For example, video encoder 20 may construct a three-dimensional array having two dimensions representative of possible horizontal and vertical positions of edges, and a third dimension to indicate edge orientation (horizontal or vertical). Video encoder 20 may declare an array, such as:

bool EdgeFilteringArray[I][J][2], where 'I' represents the maximum number of possible edges in the horizontal direction, 'J' represents the maximum number of possible edges in the vertical direction, and '2' represents the number of directions in which edges may occur (horizontal or vertical).

Suppose, for example, that an LCU has 64×64 pixels with a smallest CU size of 8×8. In this example, edges between CUs may occur at 16×16 positions within the LCU, and there may be edges in both the horizontal direction and the vertical direction. Therefore, video encoder 20 may declare an array, such as:

bool EdgeFilteringArray[8][8][2], where EdgeFilteringArray may store Boolean values ("true" or "false") for each possible edge location, indicating whether there exists a candidate edge at that location ("true") or not ("false").

Because of the introduction of SDIP, there may be more edges than 8×8 in such an LCU. That is, in addition to edges between CUs, there may be edges between SDIP PUs within an SDIP-predicted CU of the LCU. As noted above, SDIP PUs of an N×N CU may be as small as 1×N or N×1. Therefore, expanding the array discussed above to account for each possible edge in the LCU would lead to an array that has as many as 64 times more entries than the array discussed above. While this is one possible solution, this disclosure proposes an alternative data structure for storing deblocking decisions, which may be more efficient.

In some examples, rather than constructing an array that stores Boolean values, video encoder 20 may construct an array that stores Boolean values and SDIP flags. The SDIP flags may have values representative of SDIP PU sizes and directions for a particular SDIP mode. Assuming that there is a data structure called boolOrSDIPFlag, which may store either a Boolean value for an edge or an SDIP flag for a CU touching the edge, video encoder 20 may construct an array of boolOrSDIPFlag having the same size as the array described above. For example, assuming that an LCU has a size of N×N, video encoder 20 may construct an array, such as:

boolOrSDIPFlag EdgeFilteringArray[N/8][N/8][2].

For example, again supposing that the LCU has a size of 64×64 pixels, video encoder 20 may construct an array, such as:

boolOrSDIPFlag EdgeFilteringArray[8][8][2].

Table 2 below illustrates examples of values and value types that can be stored in locations of the example array described above when a CU is SDIP-predicted, based on the SDIP PU type:

TABLE 2

| SDIP partition | EdgeFilteringArray[i][j] [Vertical] | EdgeFilteringArray[i][j] [Horizontal] |
| --- | --- | --- |
| 32 × 8, 8 × 32 | Boolean or Flag 32 × 8, 8 × 32 | Boolean or Flag 32 × 8, 8 × 32 |
| 16 × 4, 4 × 16 | Boolean or Flag 16 × 4, 4 × 16 | Boolean or Flag 16 × 4, 4 × 16 |
| 16 × 1 | Boolean or Flag 16 × 1 | Boolean or Flag 16 × 1 |
| 1 × 16 | Boolean or Flag 1 × 16 | Boolean or Flag 1 × 16 |
| 8 × 2 | Boolean or Flag 8 × 2 | Boolean or Flag 8 × 2 |
| 2 × 8 | Boolean or Flag 2 × 8 | Boolean or Flag 2 × 8 |
| 4 × 1, 1 × 4, ... | Boolean or Flag | Boolean or Flag |

In some examples, each of the SDIP flags may include values representative of whether the CU is partitioned into SDIP PU partitions, and if so, a direction for the SDIP PUs (e.g., whether the longer portion of the SDIP PU partitions is horizontal or vertical) and whether the SDIP PU partitions are further partitioned into SDIP PU partitions.

After constructing the array, video encoder 20 may use the array to determine locations of possible edges of the corresponding LCU. A deblocking filtering unit, for example, may receive data of the LCU and refer to the array to determine edges that are to be deblocked. When an entry of the array has a Boolean value, the deblocking filtering unit may determine whether an edge exists between two CUs based on the Boolean value. For example, a value of "true" may indicate that an edge exists, and "false" may indicate that the edge does not exist. On the other hand, when an entry of the array has an SDIP flag value, video encoder 20 may determine whether to deblock any or all of the edges between SDIP partitions within the CU, in addition to the edge between two CUs.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). An apparatus including video encoder 20 and/or video decoder 30 may comprise an integrated circuit, a microprocessor, and/or a wireless communication device, such as a cellular telephone.

Figure 2:
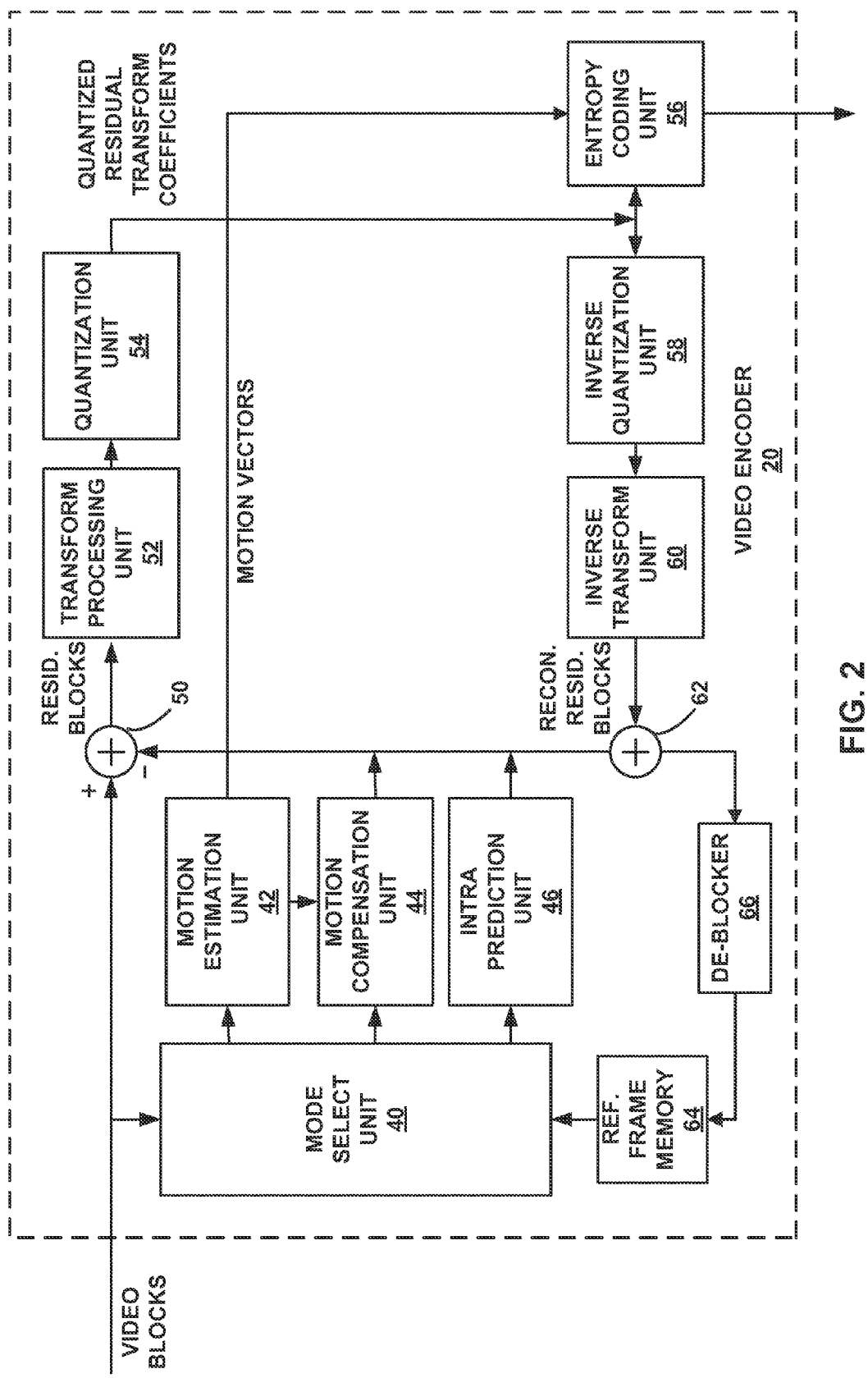
FIG. 2 is a block diagram illustrating an example of a video encoder that may implement techniques for determining whether to apply a deblocking filter to an edge between CUs based at least in part whether the CUs are predicted using SDIP.

FIG. 2 is a block diagram illustrating an example of video encoder 20 that may implement techniques for determining whether to apply a deblocking filter to an edge between CUs based at least in part whether the CUs are predicted using SDIP. Video encoder 20 may perform intra- and inter-coding of blocks within video frames, including blocks, or partitions or sub-partitions of blocks. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to any of several spatial based compression modes and inter-modes such as uni-directional prediction (P-mode) or bi-directional prediction (B-mode) may refer to any of several temporal-based compression modes.

As shown in FIG. 2, video encoder 20 receives a current video block within a video frame to be encoded. In the example of FIG. 2, video encoder 20 includes motion compensation unit 44, motion estimation unit 42, intra prediction unit 46, reference frame memory 64, summer 50, transform processing unit 52, quantization unit 54, entropy coding unit 56, and deblocker 66. For video block reconstruction, video encoder 20 also includes inverse quantization unit 58, inverse transform unit 60, and summer 62.

During the encoding process, video encoder 20 receives a video frame or slice to be coded. The frame or slice may be divided into multiple video blocks, such as LCUs. Motion estimation unit 42 and motion compensation unit 44 perform inter-predictive coding of received video blocks relative to one or more blocks in one or more reference frames to provide temporal compression. Intra-prediction unit 46 performs intra-predictive coding of received video blocks relative to pixels of neighboring, previously coded blocks in the same frame or slice. In accordance with the techniques of this disclosure, intra-prediction unit 46 may be configured to perform short-distance intra-prediction (SDIP), in addition to directional intra-prediction and DC intra-prediction. Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame.

Motion estimation unit 42 and motion compensation unit 44 may be highly integrated, but are illustrated separately for conceptual purposes. Motion estimation is the process of generating motion vectors, which estimate motion for video blocks. A motion vector, for example, may indicate the displacement of a predictive block within a predictive reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. Motion compensation may involve fetching or generating the predictive block based on the motion vector determined by motion estimation. Again, motion estimation unit 42 and motion compensation unit 44 may be functionally integrated, in some examples.

Motion estimation unit 42 calculates a motion vector for the video block of an inter-coded frame by comparing the video block to video blocks of a reference frame in reference frame memory 64. Motion compensation unit 44 may also interpolate sub-integer pixels of the reference frame, e.g., an I-frame or a P-frame. The ITU H.264 standard, as an example, describes two reference picture lists: list 0, which includes reference frames having a display order earlier than a current frame being encoded, and list 1, which includes reference frames having a display order later than the current frame being encoded. Therefore, data stored in reference frame memory 64 may be organized according to these lists.

Motion estimation unit 42 compares blocks of one or more reference frames from reference frame memory 64 to a block to be encoded of a current frame, e.g., a P-frame or a B-frame. When the reference frames in reference frame memory 64 include values for sub-integer pixels, a motion vector calculated by motion estimation unit 42 may refer to a sub-integer pixel location of a reference frame. Motion estimation unit 42 and/or motion compensation unit 44 may also be configured to calculate values for sub-integer pixel positions of reference frames stored in reference frame memory 64 if no values for sub-integer pixel positions are stored in reference frame memory 64. Motion estimation unit 42 sends the calculated motion vector to entropy coding unit 56 and motion compensation unit 44. The reference frame block identified by a motion vector may be referred to as a predictive block. Motion compensation unit 44 may calculate prediction data based on the predictive block.

Video encoder 20 forms a residual video block by subtracting the prediction data (whether predicted using intra-prediction or inter-prediction) from the original video block being coded. Summer 50 represents the component or components that perform this subtraction operation. HEVC refers to a block of residual data as a transform unit (TU). This disclosure refers to a TU as a block of residual coefficients for a CU, which should be distinguished from transform processing unit 52 of video encoder 20, which performs transformation of the TU. Transform processing unit 52 applies a transform, such as a discrete cosine transform (DCT) or a conceptually similar transform, to the residual block, producing a video block comprising residual transform coefficient values.

Transform processing unit 52 may perform other transforms, such as those defined by the H.264 standard or by HEVC, such as directional transforms, rotational transforms, discrete sine transforms, or other conceptually similar transforms. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Quantization unit 54 quantizes the residual transform coefficients to further reduce bit rate. The quantization process may reduce the bit depth associated with some or all of the coefficients. The degree of quantization may be modified by adjusting a quantization parameter.

Following quantization, entropy coding unit 56 entropy codes the quantized transform coefficients. For example, entropy coding unit 56 may perform content adaptive variable length coding (CAVLC), context adaptive binary arithmetic coding (CABAC), or another entropy coding technique. Following the entropy coding by entropy coding unit 56, the encoded video may be transmitted to another device or archived for later transmission or retrieval. In the case of context adaptive binary arithmetic coding, context may be based on neighboring blocks.

In some cases, entropy coding unit 56 or another unit of video encoder 20 may be configured to perform other coding functions, in addition to entropy coding. For example, entropy coding unit 56 may be configured to determine the CBP values for the blocks and partitions. Also, in some cases, entropy coding unit 56 may perform run length coding of the coefficients in a macroblock or partition thereof. In particular, entropy coding unit 56 may apply a zig-zag, vertical, horizontal, wavefront, or diagonal scan or other scan pattern to scan the transform coefficients in a macroblock or partition and encode runs of zeros for further compression. Entropy coding unit 56 also may construct header information with appropriate syntax elements for transmission in the encoded video bitstream.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42, motion compensation unit 44, and/or intra-prediction unit 46 as a reference block to inter-code one or more blocks in one or more subsequently coded video frames.

In accordance with the techniques of this disclosure, video encoder 20 includes de-blocker 66 that selectively filters the output of summer 62. In particular, de-blocker 66 receives reconstructed video data from summer 62, which corresponds to predictive data received from either motion compensation unit 44 or intra-prediction unit 46, added to inverse quantized and inverse transformed residual data. In this manner, de-blocker 66 receives decoded blocks of video data, e.g., CUs of an LCU and/or LCUs of a slice or frame. In general, de-blocker 66 selectively filters the blocks of video data, for example, based on whether either or both of the blocks are predicted using SDIP.

De-blocker 66 is generally configured to analyze pixels of two neighboring CUs near an edge between the two CUs to determine whether to deblock the edge. More particularly, de-blocker 66 may alter the values of the pixels near the edge when a high-frequency change in values is detected. De-blocker 66 may be configured to perform any or all of the techniques of this disclosure. For example, de-blocker 66 may be configured to determine whether to deblock the edge based at least in part on whether either or both of the CUs were predicted using SDIP. In various examples, de-blocker 66 may be configured to determine whether to deblock an edge between two CUs, at least one of which is predicted using SDIP, determine filter strength (e.g., strong or weak filter) based on whether either or both of the CUs is predicted using SDIP, and/or to determine a filtering direction based on whether either or both of the CUs is predicted using SDIP.

In some examples, de-blocker 66 is configured to determine directions of SDIP PUs in SDIP-predicted CUs, when determining whether and how to deblock an edge between two CUs. That is, in some examples, determining whether to deblock an edge between two CUs based at least in part on whether one or both of the CUs are SDIP-predicted includes determining directions for the SDIP-predicted CUs. The "direction" of an SDIP PU generally corresponds to horizontal or vertical, and more particularly, corresponds to horizontal when the longer portion of the SDIP PU is horizontal and to vertical when the longer portion of the SDIP PU is vertical.

In cases where the direction of SDIP PUs of a CU is perpendicular to an edge between the CU and another CU, then the deblocking decision function will not cross SDIP PU boundaries, and therefore, may be applied normally. Likewise, when de-blocker 66 determines to deblock such an edge, de-blocker 66 may deblock the edge normally. This is because the deblocking decision function and the deblocking filter are generally applied along lines of pixels that run perpendicular to the edge, and therefore parallel to the PU boundaries within the SDIP-predicted CU. Because the SDIP PU boundaries are parallel to the support (that is, lines of pixels) to which the deblocking decision function and the deblocking filter are applied (in this example), the deblocking decision function and deblocking filter may be applied as normal. On the other hand, when the direction of the SDIP PUs is parallel to the edge between the two CUs, de-blocker 66 may modify the deblocking decision function and/or deblocking filter. For example, de-blocker 66 may skip application of the decision function or apply the decision function to a modified set of support that does not cross an SDIP PU boundary (that is, a boundary between two SDIP PUs of the same CU).

Moreover, in addition or in the alternative to the techniques described above, de-blocker 66 may be configured to store locations of edges in the data structure described in this disclosure. That is, de-blocker 66 may be configured to construct a data structure, such as a multi-dimensional array, for storing locations of candidate edges between CUs of an LCU. The data structure may store possible locations of edges for smallest-sized CUs (e.g., 8×8 CUs) of the LCU, while also storing indications of SDIP-predicted CUs, which may need special treatment (e.g., adapted decision functions and/or adapted filters) to account for edges that may result within the CU due to SDIP.

In this manner, video encoder 20 represents an example of a video coder configured to determine a first prediction mode for a first block of video data and a second prediction mode for a second block of video data, wherein the first block and the second block share a common edge, decode the first block using the first prediction mode and the second block using the second prediction mode, and determine whether to deblock the common edge between the first block and the second block based at least in part on whether at least one of the first prediction mode and the second prediction mode comprises short distance intra-prediction (SDIP).

Moreover, video encoder 20 may be configured to determine not to deblock the edge when at least one of the first prediction mode and the second prediction mode comprises SDIP; to select an adapted set of support to which to apply a deblocking decision function used to determine whether to deblock the common edge and to which to apply a deblocking filter when at least one of the first prediction mode and the second prediction mode comprises SDIP; or to select an adapted set of support to which to apply a deblocking decision function used to determine whether to deblock the edge and to which to apply the deblocking filter, when at least one of the first prediction mode and the second prediction mode comprises SDIP, such that the adapted set of support does not cross prediction unit (PU) boundaries for SDIP PUs in the first block and the second block. In addition, video encoder 20 may be configured to, when at least one of the first prediction mode and the second prediction mode comprises SDIP, determine whether SDIP PUs are perpendicular to the common edge, and apply a deblocking decision function to an equal number of support pixels on either side of the common edge when all SDIP PUs are perpendicular to the common edge.

Furthermore, video encoder 20 may be configured to store a value indicative of a partition size for SDIP partitions in the data structure at the location of the data structure corresponding to the common edge when at least one of the first prediction mode and the second prediction mode comprises SDIP, and deblock edges based on values stored in the data structure corresponding to the edges.

Figure 3:
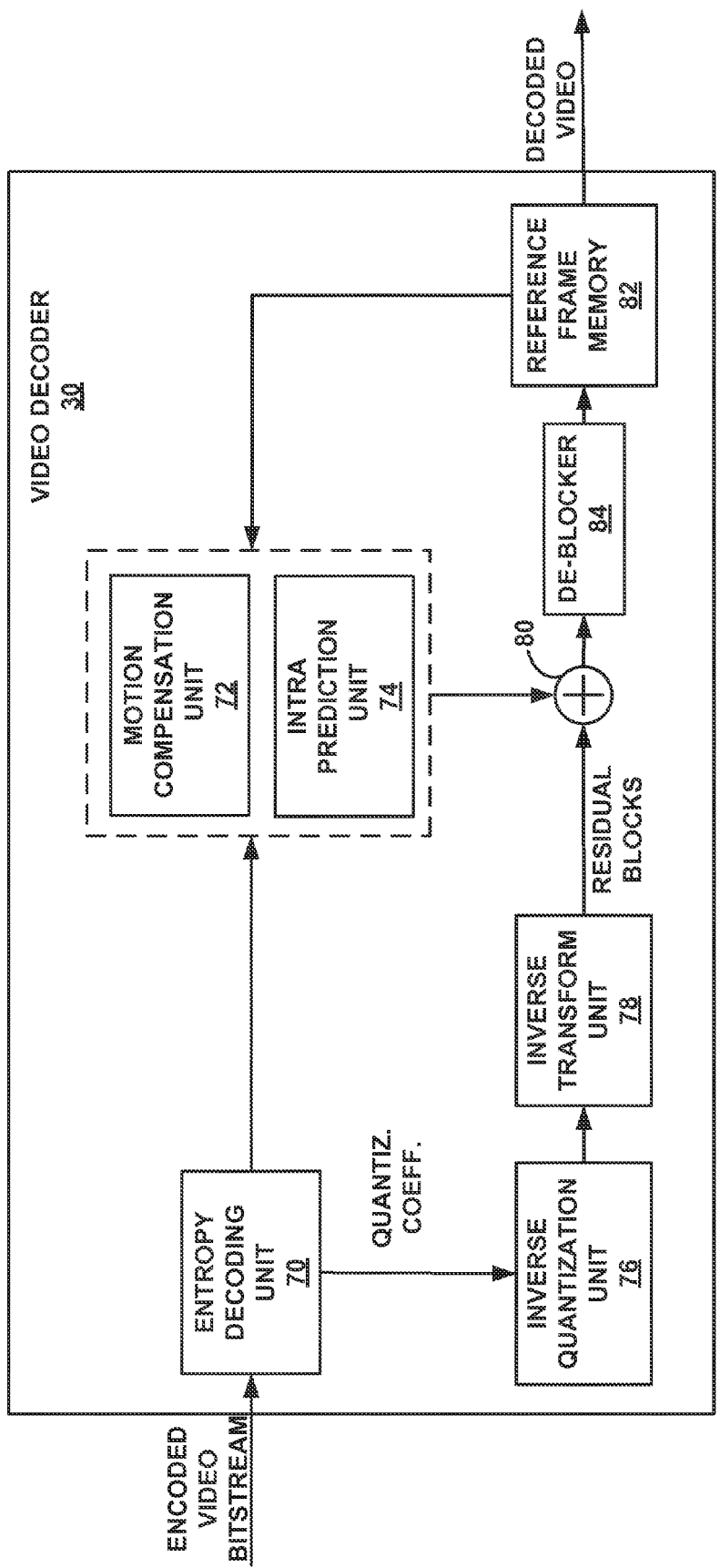
FIG. 3 is a block diagram illustrating an example of a video decoder that may implement techniques for determining whether to apply a deblocking filter to an edge between CUs based at least in part whether the CUs are predicted using SDIP.

FIG. 3 is a block diagram illustrating an example of video decoder 30 that may implement techniques for determining whether to apply a deblocking filter to an edge between CUs based at least in part whether the CUs are predicted using SDIP. In the example of FIG. 3, video decoder 30 includes an entropy decoding unit 70, motion compensation unit 72, intra prediction unit 74, inverse quantization unit 76, inverse transformation unit 78, reference frame memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70.

Motion compensation unit 72 may use motion vectors received in the bitstream to identify a prediction block in reference frames in reference frame memory 82. Intra prediction unit 74 may use intra prediction modes received in the bitstream to form a prediction block from spatially adjacent blocks. Inverse quantization unit 76 inverse quantizes, i.e., de-quantizes, the quantized block coefficients provided in the bitstream and decoded by entropy decoding unit 70. The inverse quantization process may include a conventional process, e.g., such as a process similar to that defined by the H.264 decoding standard or the upcoming HEVC standard. The inverse quantization process may also include use of a quantization parameter $QP_Y$ calculated by encoder 50 for each macroblock to determine a degree of quantization and, likewise, a degree of inverse quantization that should be applied.

Inverse transform unit 58 applies an inverse transform, e.g., an inverse DCT, an inverse integer transform, or a conceptually similar inverse transform process, to the transform coefficients in order to produce residual blocks in the pixel domain. Motion compensation unit 72 produces motion compensated blocks, possibly performing interpolation based on interpolation filters. Identifiers for interpolation filters to be used for motion estimation with sub-pixel precision may be included in the syntax elements. Motion compensation unit 72 may use interpolation filters as used by video encoder 20 during encoding of the video block to calculate interpolated values for sub-integer pixels of a reference block. Motion compensation unit 72 may determine the interpolation filters used by video encoder 20 according to received syntax information and use the interpolation filters to produce predictive blocks.

Motion compensation unit 72 uses some of the syntax information to determine sizes of blocks used to encode frame(s) of the encoded video sequence, partition information that describes how each macroblock of a frame of the encoded video sequence is partitioned, modes indicating how each partition is encoded, one or more reference frames (and reference frame lists) for each inter-encoded macroblock or partition, and other information to decode the encoded video sequence.

Summer 80 sums the residual blocks with the corresponding prediction blocks generated by motion compensation unit 72 or intra-prediction unit to form decoded blocks. De-blocker 84 selectively deblocks CUs received from summer 80 in accordance with any or all of the techniques of this disclosure. De-blocker 84 conforms substantially to de-blocker 66 (FIG. 2), in that de-blocker 84 may be configured to perform any or all of the techniques described with respect to de-blocker 66.

In this manner, video decoder 30 represents an example of a video coder configured to determine a first prediction mode for a first block of video data and a second prediction mode for a second block of video data, wherein the first block and the second block share a common edge, decode the first block using the first prediction mode and the second block using the second prediction mode, and determine whether to deblock the common edge between the first block and the second block based at least in part on whether at least one of the first prediction mode and the second prediction mode comprises short distance intra-prediction (SDIP).

Moreover, video decoder 30 may be configured to determine not to deblock the edge when at least one of the first prediction mode and the second prediction mode comprises SDIP; to select an adapted set of support to which to apply a deblocking decision function used to determine whether to deblock the common edge and to which to apply a deblocking filter when at least one of the first prediction mode and the second prediction mode comprises SDIP; or to select an adapted set of support to which to apply a deblocking decision function used to determine whether to deblock the edge and to which to apply the deblocking filter, when at least one of the first prediction mode and the second prediction mode comprises SDIP, such that the adapted set of support does not cross prediction unit (PU) boundaries for SDIP PUs in the first block and the second block. In addition, video decoder 30 may be configured to, when at least one of the first prediction mode and the second prediction mode comprises SDIP, determine whether SDIP PUs are perpendicular to the common edge, and apply a deblocking decision function to an equal number of support pixels on either side of the common edge when all SDIP PUs are perpendicular to the common edge.

Furthermore, video decoder 30 may be configured to store a value indicative of whether the common edge was determined to be deblocked in a data structure at a location of the data structure corresponding to the common edge when the first prediction mode and the second prediction mode both comprise modes other than SDIP, store a value indicative of a partition size for SDIP partitions in the data structure at the location of the data structure corresponding to the common edge when at least one of the first prediction mode and the second prediction mode comprises SDIP, and deblock edges based on values stored in the data structure corresponding to the edges.

Figure 4:
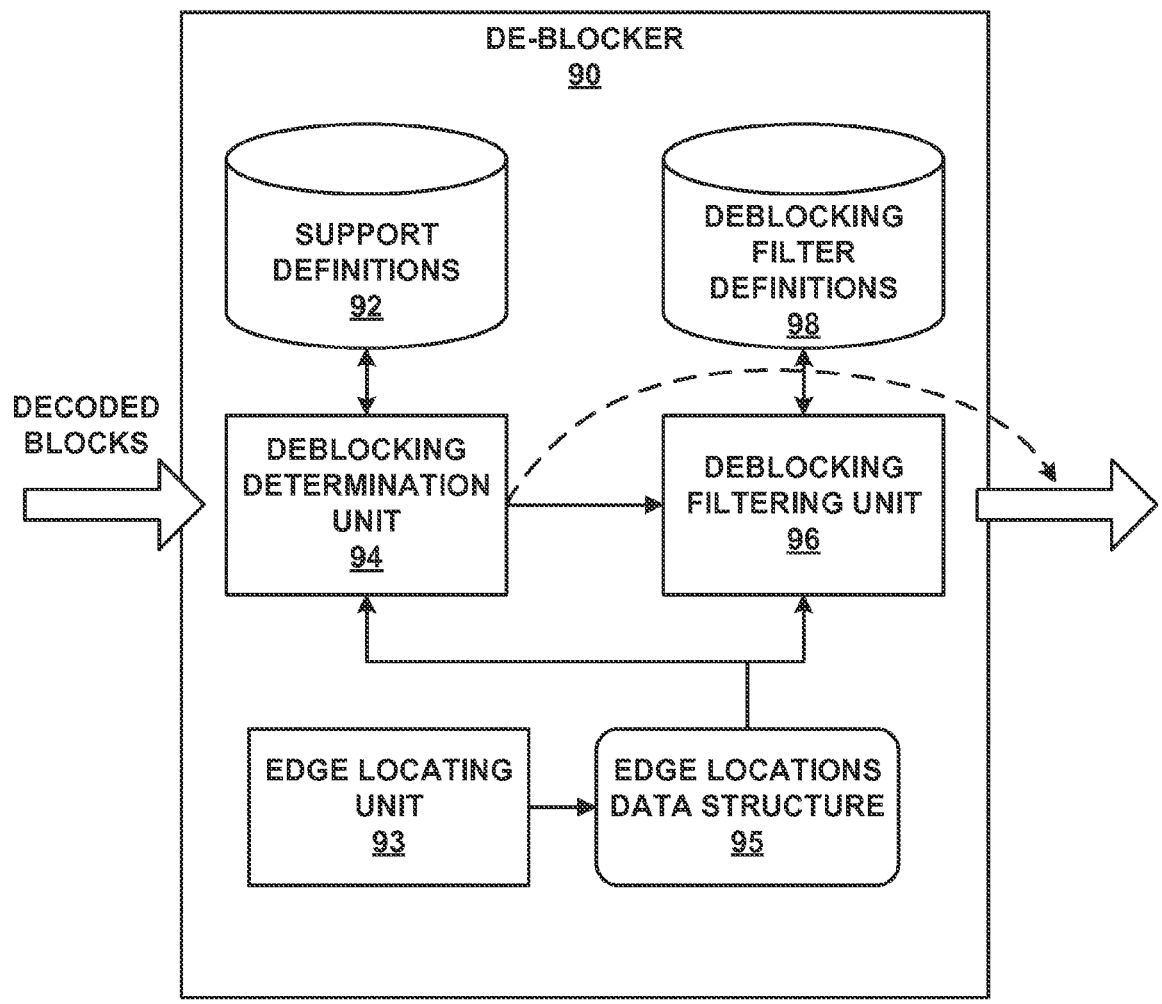
FIG. 4 is a block diagram illustrating components of an example de-blocker.

FIG. 4 is a block diagram illustrating components of an example de-blocker 90. In general, either or both of de-blocker 66 (FIG. 2) and de-blocker 84 (FIG. 3) may include components substantially similar to those of de-blocker 90. Other video coding devices, such as video encoders, video decoders, video encoder/decoders (CODECs), and the like may also include components substantially similar to de-blocker 90. De-blocker 90 may be implemented in hardware, software, or firmware. When implemented in software or firmware, corresponding hardware (such as one or more processors or processing units and memory for storing instructions for the software or firmware) may also be provided.

In the example of FIG. 4, de-blocker 90 includes deblocking determination unit 94, a memory storing support definitions 92, deblocking filtering unit 96, a memory storing deblocking filter definitions 98, edge locating unit 93, and a memory storing data according to an edge locations data structure 95. Any or all of the components of de-blocker 90 may be functionally integrated. The components of de-blocker 90 are illustrated separately only for purposes of illustration. In general, de-blocker 90 receives data for decoded blocks, e.g., from a summation component that combines prediction data with residual data for the blocks. The data may further include an indication of how the blocks were predicted. In the example described below, de-blocker 90 is configured to receive data including a decoded LCU and a CU quadtree for the LCU, where the CU quadtree describes how the LCU is partitioned into CUs and indicates prediction modes for leaf-node CUs.

De-blocker 90 may maintain edge locations data structure 95 in a memory of de-blocker 90, or in an external memory provided by a corresponding video coding device. In some examples, edge locating unit 93 may receive a CU quadtree corresponding to an LCU that indicates how the LCU is partitioned into CUs. Edge locating unit 93 may then analyze the CU quadtree to determine edges between CUs in the LCU that are candidates for deblocking Edge locations data structure 95 may comprise an array having a horizontal dimension, a vertical dimension, and a dimension representative of horizontal edges and vertical edges. In general, edges between CUs may occur between two smallest-sized CUs of the LCU. Thus, assuming that the LCU has a size of N×N, and assuming that the smallest-sized CU of the LCU is of size M×M, the array may comprise a size of [N/M]×[N/M]×2, where '2' represents the two possible directions of edges between CUs (horizontal and vertical). For example, assuming that an LCU has 64×64 pixels and a 8×8 smallest-sized CU, the array may comprise [8]×[8]×[2] entries.

Each entry may generally correspond to a possible edge between two CUs. Edges might not in fact exist at each of the positions within the LCU corresponding to each of the entries of edge locations data structure 95. Accordingly, values of the data structure may be initialized to false. In general, edge locating unit 93 may analyze the CU quadtree to determine locations of edges between two CUs of the LCU and set corresponding values in edge locations data structure 95 to true.

In general, the entries of the array may describe whether a corresponding edge exists in the LCU as a candidate for deblocking That is, when edge locating unit 93 determines that an edge between two neighboring CUs of the LCU exists, edge locating unit 93 may set a value of the corresponding entry in edge locations data structure 95 to indicate that the edge exists (e.g., to a value of "true").

In some examples, when one of the two CUs is predicted using SDIP, edge locating unit 93 may store a value indicative of the type of SDIP partitions used for the CU in the corresponding location of edge locations data structure 95. In this manner, edge locations data structure 95 need not include additional entries to represent additional possible edges within the LCU. Instead, the types of values that may be stored in edge locations data structure 95 may be modified, in accordance with the techniques of this disclosure, to store either Boolean values or SDIP flags. For example, edge locating unit 93 may store values representative of SDIP predicted CUs in edge locations data structure 95.

Deblocking determination unit 94 generally determines whether, for two neighboring blocks (e.g., two CUs or two PUs), an edge between the two blocks should be deblocked. Deblocking determination unit 94 may determine locations of edges using edge locations data structure 95. When a value of edge locations data structure 95 has a Boolean value, deblocking determination unit 94 may determine that a "true" value indicates the presence of an edge, and a "false" value indicates that no edge is present, in some examples. When a value of edge locations data structure 95 has an SDIP flag value, deblocking determination unit 94 may determine locations of edges between SDIP PUs based on the value of the SDIP flag. In accordance with the techniques of this disclosure, deblocking determination unit 94 may determine whether to deblock an edge between two CUs based at least in part on whether one or both of the CUs is predicted using SDIP. Deblocking determination unit 94 may also determine locations of SDIP PU edges and determine whether to deblock any or all of the edges between SDIP PUs.

In general, deblocking determination unit 94 may be configured with one or more deblocking determination functions. The functions may include functions that apply a plurality of coefficients to lines of pixels that cross the edge between the blocks. For example, the functions may be applied to a line of eight pixels that is perpendicular to the edge, where four of the pixels are in one of the two blocks and the other four pixels are in the other of the two blocks. Support definitions 92 define support for the functions. In general, the "support" corresponds to the pixels to which the functions are applied. Various examples of sets of support are described in greater detail below with respect to FIG. 6.

Deblocking determination unit 94 may be configured to apply one or more deblocking determination functions to one or more sets of support, as defined by support definitions 92, to determine whether a particular edge between two blocks of video data should be deblocked. In some examples, however, deblocking determination unit 94 is configured to skip application of the deblocking determination functions to a particular edge, e.g., when at least one of the two blocks is predicted using SDIP. In this manner, de-blocker 90 (and likewise, the corresponding video coding device including de-blocker 90) may be configured to determine whether to deblock an edge between two blocks based at least in part on whether at least one of the two blocks is predicted using SDIP.

Skipping application of the deblocking determination functions when one of the two blocks is predicted using SDIP may save processing power, improve battery life, and result in a better user experience due to avoidance of false positive results. In other examples, de-blocker 90 may be configured to determine whether to deblock an edge between two blocks based at least in part on whether at least one of the two blocks is predicted using SDIP in other manners.

For example, depending on the distance (in pixels) between the SDIP PU edges and the current edge, or the SDIP PU dimensions (in pixels), deblocking determination unit 94 may apply alternative deblocking decisions or filters with adapted support regions, such that the alternative decisions and/or support do not cross the SDIP PU edges. That is, support definitions 92, in some examples, may include data describing, for the various support definitions, the types of SDIP predicted blocks to which the support may be applied. The received data for the blocks may describe the distance between SDIP PU edges and the current edge, or SDIP PU dimensions. Accordingly, deblocking determination unit 94 may select an appropriate set of support for the SDIP PU dimensions or distance between SDIP PU edges and the current edge. For example, when an edge between two SDIP PU edges is two pixels from the current edge (that is, the edge between the two blocks), deblocking determination unit 94 may select a set of support having only two pixels in the SDIP-predicted block, for six pixels total to which deblocking determination unit 94 may apply an adapted filter (four pixels on a non-SDIP PU side of the edge and two pixels on the SDIP PU side of the edge).

As another example, depending on the SDIP PU types in the neighborhood of the current edge, deblocking determination unit 94 may apply alternative deblocking decisions or filters with adapted support regions that do not cross the SDIP PU edges. That is, rather than selecting the set of support and/or the deblocking determination function based on the distance between the current edge and the SDIP PU edges, or based on the SDIP PU dimensions, deblocking determination unit 94 may be configured to select the set of support and/or the deblocking determination function based on SDIP PU types for the blocks having the common edge.

As still another example, deblocking determination unit 94 may adapt deblocking decision functions depending on the direction or orientation of SDIP partitions with respect to the direction of the current edge. FIG. 7, discussed in greater detail below, provides various examples of possible combinations of SDIP partitions of two neighboring blocks relative to a common edge between the two neighboring blocks. In general, in these examples, deblocking determination unit 94 may be configured to adapt the support and/or decision functions only when one or both of the blocks is predicted using SDIP PUs that are parallel to the common edge between the two blocks.

The dashed line originating from deblocking determination unit 94 represents data for blocks being output without being filtered. In cases where deblocking determination unit 94 determines that an edge between two blocks should not be filtered, de-blocker 90 may output the data for the blocks without altering the data. That is, the data may bypass deblocking filtering unit 96, such that the data is not deblock filtered. On the other hand, when deblocking determination unit 94 determines that an edge should be deblocked, deblocking determination unit 94 may cause deblocking filtering unit 96 to filter values for pixels near the edge, to deblock the edge.

Deblocking filtering unit 96 retrieves definitions of deblocking filters from deblocking filter definitions 98 for edges to be deblocked, as indicated by deblocking determination unit 94. For edges between SDIP PUs and edges between CUs that are SDIP predicted, deblocking filtering unit 96 may retrieve adapted deblocking filters from deblocking filter definitions 98, such that the filters do not cross SDIP PU boundaries. In general, filtering of an edge uses values of pixels from the neighborhood of a current edge to be deblocked. Therefore, both deblocking decision functions and deblocking filters may have a certain support region on both sides of an edge. By applying a deblocking filter to pixels in the neighborhood of an edge, deblocking filtering unit 96 may smooth the values of the pixels such that high frequency transitions near the edge are dampened. In this manner, application of deblocking filters to pixels near an edge may reduce blockiness artifacts near the edge.

Figure 5:
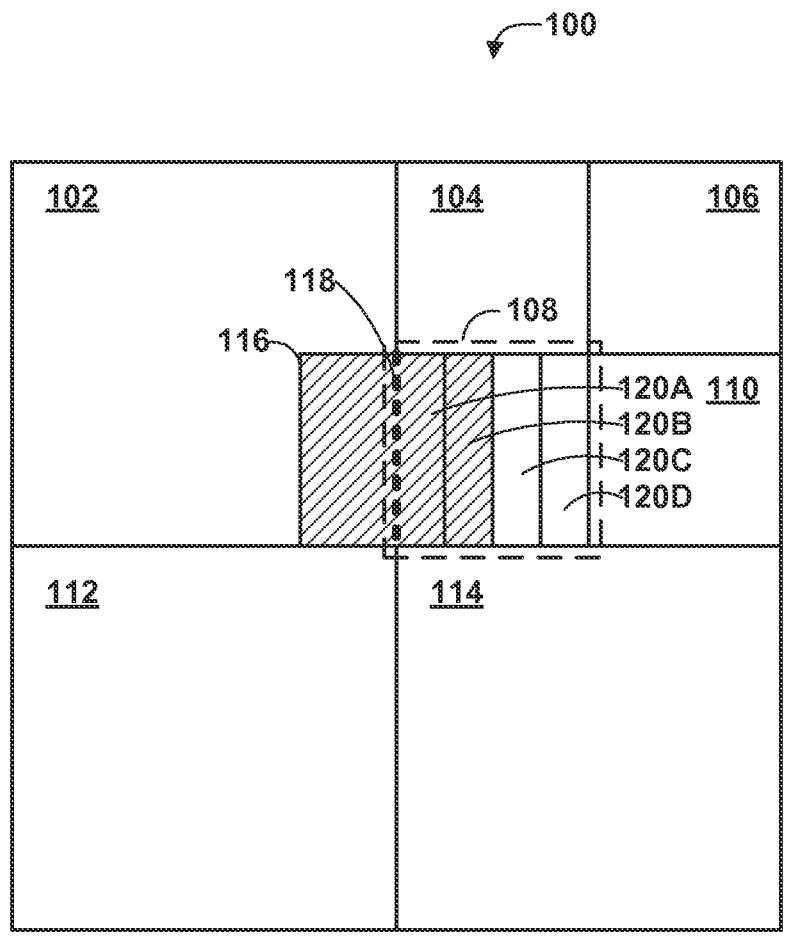
FIG. 5 is a conceptual diagram illustrating an example largest coding unit (LCU) including an SDIP-predicted CU.

FIG. 5 is a conceptual diagram illustrating an example LCU 100 including an SDIP-predicted CU. In particular, LCU 100 includes sub-CUs 102, 104, 106, 108, 110, 112, and 114, in this example. Each of sub-CUs 102, 104, 106, 108, 110, 112, and 114 corresponds to a leaf node CU. A non-leaf node CU would include sub-CUs 104, 106, 108, and 110 as well, in this example. Each of the leaf node sub-CUs may be predicted according to a particular prediction mode. In this example, sub-CU 108 is predicted using SDIP. Accordingly, sub-CU 108 includes four PUs 120A-120D (PUs 120). As shown in this example, PUs 120 are horizontal PUs of sub-CU 108.

A video coding device, such as video encoder 20 or video decoder 30, may decode LCU 100 and then determine whether to deblock edges between sub-CUs 102, 104, 106, 108, 110, 112, and 114, in accordance with the techniques of this disclosure. For purposes of illustration, FIG. 5 shows edge 118 using a dashed line, as an example of an edge that may be considered for deblocking. In this example, edge 118 occurs at a boundary between sub-CU 108 and sub-CU 102. Edges may occur between neighboring sub-CUs even when the sub-CUs are not the same size, as shown in this example.

FIG. 5 also illustrates a region of support 116 for edge 118. Conventionally, various pixels of region of support 116 would be used when determining whether to deblock edge 118, as well as to filter pixels near edge 118 when a decision is made to deblock edge 118. As shown in FIG. 5, sub-CU 108 is predicted using SDIP, and region of support 116 crosses an edge between SDIP PUs 120A and 120B. Thus, various aspects of the techniques of this disclosure may be performed. For example, determination of whether to deblock edge 118 may be skipped.

Alternatively, region of support 116 may be adapted such that an actual region of support used when determining whether to deblock edge 118, and used to filter pixels near edge 118 when the decision is made to deblock edge 118, does not cross the boundary between PU 120A and PU 120B. For example, such a region of support may include all of region of support 116 within sub-CU 102, but only the portion of region of support 116 within PU 120A. The adapted support for deblocking decision functions and/or deblocking filters may be selected based on, for example, a distance between edge 118 and the edge between SPUs 120A and 120B, dimensions of PUs 120, or a type of SDIP mode for CU 108. The SDIP type may define an orientation of PUs 120 and widths of PUs 120.

FIG. 6 is a conceptual diagram illustrating pixel positions of two example blocks 130, 132 near edge 134 between blocks 130 and 132. Each of the pixel positions is designated using the format $[p|q]I_J$, where p corresponds to block 130 and q corresponds to block 132, I corresponds to a distance from edge 134, and J corresponds to a row indicator from top to bottom of blocks 130 and 132. In some examples, support used for deblocking decision functions and deblocking filters has a line of eight pixels. In such examples, for a given line X where $0 \leq X \leq 7$, each of pixels $p3_X$ to $q3_X$ may be used as support. Accordingly, for these examples, if either of blocks 130 or 132 is predicted using SDIP, and the SDIP mode is vertical with a partition width less than four, the eight-pixel support would cross an SDIP PU boundary.

In some examples, when either or both of blocks 130 and 132 are predicted using SDIP, the deblocking decision function and/or deblocking filter may be adapted. Table 3 below describes one example set of filters and deblocking decision conditions that may be applied based on SDIP modes for two blocks, labeled "Block A" and "Block B" in Table 3. It should be understood that such blocks do not necessarily correspond to blocks 130 and 132 of FIG. 6, as the blocks referred to in Table 3 may have sizes larger than 8×8 pixels. However, FIG. 6 provides an example pair of blocks for reference that may correspond to Block A and Block B, respectively, when blocks A and B of Table 3 have 8×8 pixels. It is assumed that for the listed SDIP modes for blocks A and B in Table 3, the edge between blocks A and B is parallel to the SDIP partitions; references to "perpendicular SDIP PU" are intended as references to an SDIP mode that is perpendicular to the edge between blocks A and B. Further, blocks A and B are assumed to correspond to CUs, rather than PUs of a common CU. Table 6 below provides additional examples for internal SDIP partition boundaries.

TABLE 3

| Block A | Block B | Filter Type | Decision Conditions |
| --- | --- | --- | --- |
| 32 × 8 | Not SDIP type or perpendicular SDIP-PU | Strong or Weak4 | Deblock edge on/off Strong or weak filter |
| 32 × 8 | 32 × 8 | Strong or Weak4 | Deblock edge on/off Strong or weak filter |
| 32 × 8 | 16 × 4 | Weak2 | Deblock edge on/off |
| 32 × 8 | 16 × 1 | Weak1 | Deblock edge on/off |
| 32 × 8 | 8 × 2 | Weak1 | Deblock edge on/off |

TABLE 3-continued

| Block A | Block B | Filter Type | Decision Conditions |
|---|---|---|---|
| 16 × 4 | Not SDIP type or perpendicular SDIP-PU | Weak2 | Deblock edge on/off |
| 16 × 4 | 16 × 4 | Weak2 | Deblock edge on/off |
| 16 × 4 | 16 × 1 | Weak1 | Deblock edge on/off |
| 16 × 4 | 8 × 2 | Weak1 | Deblock edge on/off |
| 8 × 2 | Not SDIP type or perpendicular SDIP-PU | Weak1 | Deblock edge on/off |
| 8 × 2 | 16 × 1 | Weak1 | Deblock edge on/off |
| 8 × 2 | 8 × 2 | Weak1 | Deblock edge on/off |
| 16 × 1 | Not SDIP type or perpendicular SDIP-PU | Weak1 | Deblock edge on/off |
| 16 × 1 | 16 × 1 | Weak1 | Deblock edge on/off |
| Not SDIP type or perpendicular SDIP-PU | Not SDIP type or perpendicular SDIP-PU | Normal deblocking Filters | Normal deblocking decision conditions |

Table 3 provides examples of deblocking filter types and deblocking decision conditions for deblocking of a CU-boundary edge (horizontal or vertical direction) between two blocks, block A and block B, when at least one of the blocks contains a whole or partial SDIP-PU that is parallel with and adjacent to the current CU-boundary edge to be deblocked. Filters and decision conditions are such that no SDIP-PU edges or other non-SDIP-PU or TU edges are crossed, which can lead to erroneous deblocking of the current edge. In addition, there are no dependencies between the deblocking of the vertical (horizontal) edges, which allows for parallel deblocking of vertical (horizontal) edges.

In case that neither block A nor block B is of the SDIP type, or the SDIP-PU orientation (longest dimension) is perpendicular to the CU-boundary edge to be filtered, then normal deblocking may be applied. Normal deblocking refers to the deblocking method, such as version 3 of HM (HM3) deblocking, that is applied to block edges that are unrelated to SDIP.

Table 4 below provides examples of various types of filters that may be used to deblock an edge, based on the third column of Table 3 ("Filter Type"). In this example, there are four types of filters: Strong, Weak4, Weak2, and Weak1. These various filters may be selected to deblock, e.g., edge 134 when a deblocking decision function indicates that the edge should be selected. Moreover, Table 3 above provides example indications of when each filter may be selected, while Table 4 provides examples of the filter coefficients for each of these example filters. That is, Table 4 provides example equations to apply to values for pixels of, e.g., blocks 130 and 132, based on whether either or both of blocks 130 and 132 are predicted using SDIP, in accordance with the example of Table 3 above.

TABLE 4

| Filter Type | Filter Definition |
|---|---|
| Strong Filter | $p_0' = (p_2 + 2 * p_1 + 2 * p_0 + 2 * q_0 + q_1 + 4)/8$ |
| | $p_1' = (p_2 + p_1 + p_0 + q_0 + 2)/4$ |
| | $p_2' = (2 * p_3 + 3 * p_2 + p_1 + p_0 + q_0 + 4)/8$ |
| | $q_0' = (p_1 + 2 * p_0 + 2 * q_0 + 2 * q_1 + q_2 + 4)/8$ |
| | $q_1' = (p_0 + q_0 + q_1 + q_2 + 2)/4$ |
| | $q_2' = (p_0 + q_0 + q_1 + 3 * q_2 + 2 * q_3 + 4)/8$ |
| Weak4 Filter | $\Delta = (9 * (q_0-p_0) - 3 * (q_1-p_1) + 8)/16$ |
| | $\Delta = \text{Clip}(-t4, t4, \Delta)$ (t4 is threshold, depending on quantization parameter) |
| | $p_0' = p_0 + \Delta$ |
| | $q_0' = q_0 - \Delta$ |

TABLE 4-continued

| Filter Type | Filter Definition |
|---|---|
| | $\Delta p = \text{Clip}(-(t4/2), t4/2, ((p_2 + p_0 + 1)/2 - p_1 + \Delta + 1)/2)$ |
| | $p_1' = p_1 + \Delta p$ (deblocking of p1 optionally depending on decision conditions) |
| | $\Delta q = \text{Clip}(-(t4/2), t4/2, ((q_2 + q_0 + 1)/2 - q_1 - \Delta + 1)/2)$ |
| | $q_1' = q_1 + \Delta q$ (deblocking of q1 optionally depending on decision conditions) |
| Weak2 Filter | $\Delta = (9 * (q_0 - p_0) - 3 * (q_1 - p_1) + 8)/16$ |
| | $\Delta = \text{Clip}(-t2, t2, \Delta)$ (t2 is threshold, depending on quantization parameter) |
| | $p_0' = p_0 + \Delta$ |
| | $q_0' = q_0 - \Delta$ |
| Weak1 Filter | $\Delta = (5 * (q_0 - p_0) + 8)/16$ |
| | $\Delta = \text{Clip}(-t1, t1, \Delta)$ (t1 is threshold, depending on quantization parameter) |
| | $p_0' = p_0 + \Delta$ |
| | $q_0' = q_0 - \Delta$ |

Table 5 describes an example set of deblocking decision function conditions, corresponding to the fourth column of Table 3 above. For various combinations of SDIP modes for blocks A and B, Table 3 indicates various deblocking conditions, which provide example indications of whether to deblock the edge occurring between blocks A and B. In some cases, column 3 of Table 3 indicates an option of filters to apply for a given set of SDIP modes, and Table 5 provides an example selection method between these filters in such cases.

TABLE 5

| Decision Condition | Decision Parameters |
|---|---|
| Deblock edge on/off | $|p0i - q0i| < \alpha$ (condition 1) |
| | $|p1i - p0i| < \beta$ (condition 2) |
| | $|q1i - q0i| < \beta$ (condition 3) |
| | For i = 2 and i = 5: |
| | If all of conditions 1 - 3 are true, then edge is deblocked ($\alpha$ and $\beta$ are thresholds depending on the quantization parameter) |
| Strong or weak filter | $|p0 - q0| < \delta$ |
| | $|q1 - q0| + |q2 - q0| + |q3 - q0| + |p1 - p0| + |p2 - p0| + |p3 - p0| < \mu$ |
| | Conditions tested on line basis |
| | If conditions are true, then strong filter is applied to the line, else weak filter |
| | ($\delta$ and $\mu$ are thresholds depending on the quantization parameter) |

Table 6 provides examples for deblocking internal SDIP partition boundaries of SDIP-Level 1. SDIP-Level 1 refers to the partitioning of, for example, 32×32, 16×16, or 8×8 CUs into SDIP partitions (horizontal or vertical) of sizes 32×8, 16×4, or 8×2, respectively. SDIP-Level 2 refers to the further partitioning of the SDIP-Level 1 partitions, for example, the 16×4 partitions may be further split into 16×1 partitions (horizontal and vertical), which is described in greater detail with respect to Table 7. There are three internal edges in case of SDIP-CU sizes 32×32, 16×16, or 8×8. The internal edges are SDIP-PU boundaries. Table 6 specifies what filtering type or decision conditions to apply for the edge in between blocks A and B. With respect to Table 6, blocks A and B contain a whole or partial SDIP-PU that is parallel with and adjacent to the current internal edge to be deblocked (e.g., edge 134 of FIG. 6). Values for the third and fourth columns of Table 6 (Filter Type and Decision Conditions) may be interpreted relative to the examples of Tables 4 and 5 above.

TABLE 6

| Block A | Block B | Filter Type | Decision Conditions |
| --- | --- | --- | --- |
| 32 × 8 | 32 × 8 | Strong or Weak4 | Deblock edge on/off Strong or weak filter |
| 16 × 4 | 16 × 4 | Weak2 | Deblock edge on/off |
| 16 × 4 | 16 × 1 | Weak1 | Deblock edge on/off |
| 16 × 1 | 16 × 1 | Weak1 | Deblock edge on/off |
| 8 × 2 | 8 × 2 | Weak1 | Deblock edge on/off |

Table 7 describes an example Level 2 SDIP, in which a 16×4 SDIP PU is further partitioned into four 16×1 SDIP PUs. In this example, the internal edges are not deblocked in order to preserve texture detail. In other examples, other deblocking decision functions and/or deblocking functions may be selected.

TABLE 7

| Block A | Block B | Filter Type | Decision Conditions |
| --- | --- | --- | --- |
| 16 × 1 | 16 × 1 | No filtering | No conditions |

While the example of FIG. 6, and the examples of Tables 3-7 above, are described with respect to two side-by-side neighboring blocks, it should be understood that similar techniques may be applied to top-bottom neighboring blocks, with appropriate modifications made to references to individual pixels and swapping "row" for "column."

FIGS. 7A-7I are conceptual diagrams illustrating various SDIP PU orientations relative to an edge between two blocks. Although examples of side-by-side blocks are shown, it should be understood that similar techniques may be applied with respect to top-bottom neighboring blocks. FIG. 7A depicts blocks 150, 152 having edge 151. In this example, blocks 150 and 152 are predicted using prediction modes other than SDIP. Therefore, edge 151 may be processed for deblocking normally (that is, without further consideration or adaptation due to SDIP prediction).

FIG. 7B depicts blocks 154, 156 having edge 155. In this example, block 154 is predicted using a prediction mode other than SDIP. Although block 156 is predicted using SDIP, the SDIP PUs of 156 are perpendicular to edge 155, in this example. Therefore, lines of support (which are generally perpendicular to edge 155) will be parallel to the edges between the SDIP PUs of block 156. Accordingly, edge 155 may be processed for deblocking normally as well. Similarly, for FIG. 7D, in which blocks 162 and 164 have edge 163, block 162 is SDIP predicted using SDIP PUs that are perpendicular to edge 163, and thus, edge 163 may be processed for deblocking normally. Likewise, for FIG. 7E, in which blocks 166 and 168 have edge 167, both blocks 166 and 168 are predicted using SDIP PUs that are perpendicular to edge 167, and thus, edge 167 may be processed for deblocking normally as well.

FIG. 7C depicts blocks 158 and 160 have edge 159. In this case, depending on the width of the SDIP PUs of block 160, a region of support may cross PU boundaries between SDIP PUs of block 160. Accordingly, processing of edge 159 for deblocking may include utilizing adapted deblocking decision functions, support, and/or deblocking filters. The adaptations may be performed to avoid crossing SDIP PU boundaries of block 160 when processing edge 159 for deblocking. Similarly, adapted decision functions and deblocking filters may be used when processing edge 175 of FIG. 7G, formed between blocks 174 and 176, as block 174 is predicted using SDIP PUs that are parallel to edge 175. In the case of FIG. 7I, blocks 182 and 184, which have edge 183, are both predicted using SDIP PUs that are parallel to edge 183. Accordingly, the adaptation of the decision functions and support may avoid crossing SDIP PU boundaries in both blocks 182 and 184.

Likewise, adapted sets of support, decision functions, and/or deblocking filters may be applied to edge 171 formed between blocks 170 and 172 of FIG. 7F and edge 179 formed between blocks 178 and 180 of FIG. 7H. Although blocks 170 and 180 are predicted using SDIP PUs, these SDIP PUs are perpendicular to edge 171 and edge 179, respectively. Therefore, the adapted support, functions, and filters need not account for edges in blocks 170 and 180. However, because blocks 172 and 178 are predicted using SDIP PUs that are parallel to edges 171 and 179, respectively, adapted support, functions, and filters may be selected to avoid crossing SDIP PU boundaries in blocks 172 and 178.

In general, adaptation of deblocking may include modifying deblocking decisions and/or deblocking filters in such a manner that, for example, the support region size is decreased/increased and/or the direction is altered with respect to the edge to be deblocked. The support region generally corresponds to the collection of pixels near the current edge to be deblocked that is employed by the computation of decisions or the filtering. The adaptation of the support region may be symmetric or asymmetric with respect to the current edge to be deblocked. In addition to the support region, the deblocking decision computation and/or the filters may be changed, for example, by changing the filter coefficients.

Figure 8:
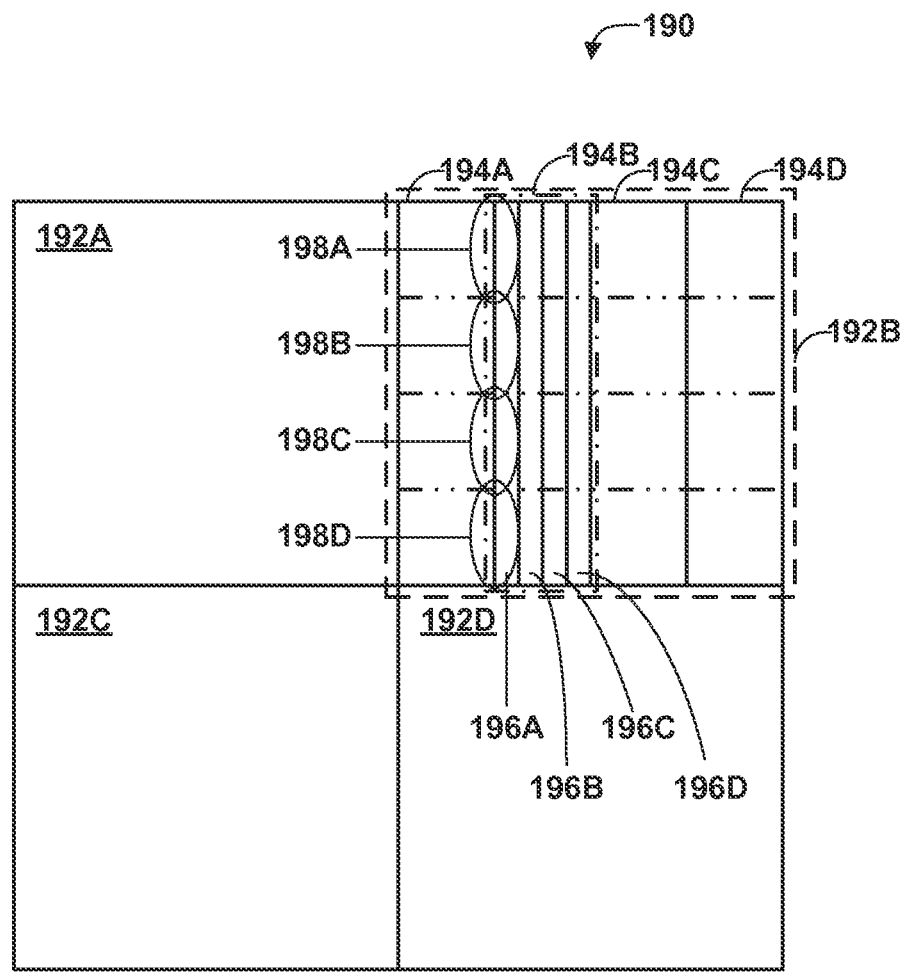
FIG. 8 is a conceptual diagram illustrating an example CU in which an SDIP PU is partitioned into further SDIP PUs.

FIG. 8 is a conceptual diagram illustrating an example CU 190 in which an SDIP PU is partitioned into further SDIP PUs. In particular, CU 190 is partitioned into sub-CUs 192A-192D. In this example, sub-CU 192B corresponds to a leaf-node CU that is predicted using SDIP. In this example, sub-CU 192B includes four SDIP PU partitions 194A-194D. Moreover, in this example, SDIP PU partition 194B is further partitioned into SDIP PU partitions 196A-196D. For example, SDIP PU partitions 194A-194D may comprise 16×4 PUs, while SDIP PU partitions 196A-196D may comprise 16×1 PUs.

FIG. 8 also illustrates three horizontal dot-dot-dashed lines through sub-CU 192B. Although sub-CU 192B is not partitioned horizontally, these dot-dot-dashed lines are meant to represent various segments of edges between SDIP PU partitions 194 and 196. These segments may be analyzed individually, in some examples. Thus, FIG. 8 illustrates segments 198A-198D of the edge between SDIP PU partition 194A and SDIP PU partition 194B. Accordingly, a data structure (such as an array) corresponding to CU 190 may include entries for each possible horizontal and vertical edge. For example, the data structure may include locations for each of segments 198. In accordance with some examples of the techniques of this disclosure, the corresponding locations in the data structure for segments 198 may include an SDIP flag representative of an SDIP mode for SDIP PUs 196, e.g., flag16×1. A video coding device may use the value stored in this location to determine that there are four vertical edges within SDIP PU 194B, and accordingly, to determine whether to deblock any or all of these edges.

By contrast, assuming that sub-CUs 192C and 192D are predicted using modes other than SDIP, locations in the data structure may indicate the presence of the edge between sub-CUs 192C and 192D. For example, the locations of the data structure corresponding to this edge may each have values of "true." In this manner, the video coding device may determine the presence of the edge between sub-CUs 192C and 192D, and apply conventional deblocking, as neither of sub-CUs 192C nor 192D are predicted using SDIP.

In some examples, SDIP partition types can be determined for a CU according to the following. For the CU, a video coding device may determine the value of the SDIP flag stored in the corresponding location of the data structure, which may indicate whether the CU is split into SDIP partitions. For example, a 16×16 CU may include four SDIP partitions of size 16×4 or 4×16 when the SDIP flag indicates as such, for example, when the flag has a value of "true." When the CU has SDIP partitions, the video coding device, e.g., video encoder 20 or video decoder 30, as applicable, may determine the value of an SDIP direction flag, which may indicate whether the SDIP partitions are horizontal or vertical. For example, the SDIP direction flag containing a value of "true" may correspond to vertical partitions, while "false" may correspond to horizontal partitions. Then, for each SDIP partition in the CU, the video coding device may determine the value of an SDIP mode flag, which may indicate for the SDIP partition whether it is split further into additional SDIP partitions. For example, for an SDIP partition of size 16×4, a value of "true" for a corresponding SDIP mode flag may indicate that the 16×4 partition is further split into 16×1 partitions.

With respect to the example of FIG. 8, a video coding device may determine an SDIP flag for sub-CU 192B, which in this case may have a value (e.g., "true") indicating that sub-CU 192B is split into SDIP partitions. The video coding device may then determine a value of an SDIP direction flag for sub-CU 192B, which in this case may have a value (e.g., "true") indicating that the SDIP partitions are vertical. Further, for each of SDIP PU partitions 194A-194D, the video coding device may determine a value of a respective SDIP mode flag that indicates whether the corresponding SDIP PU partition is split into further partitions. In this example, SDIP mode flags for SDIP PU partitions 194A, 194C, and 194D may have values (e.g., "false") indicating that these SDIP PU partitions are not split into further SDIP PUs, while SDIP PU partition 194B may have a value (e.g., "true") indicating that SDIP PU partition 194B is split into further SDIP PU partitions 196A-196D. Similarly, the video decoding device may initially analyze CU 190 to set these respective values in the data structure.

Figure 9:
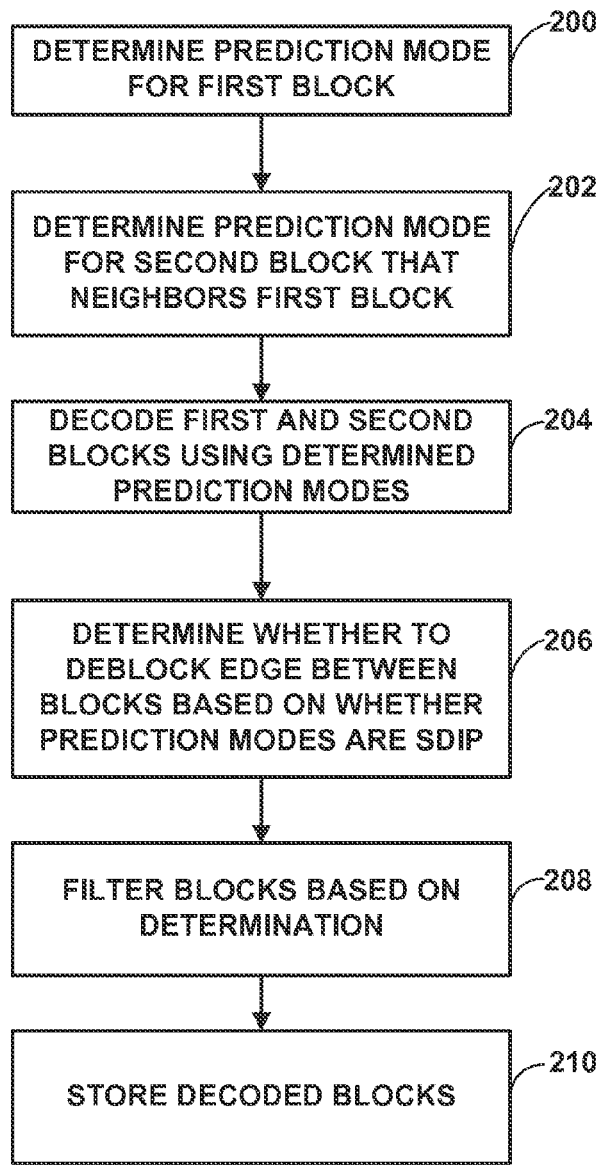
FIG. 9 is a flowchart illustrating an example method for determining whether to deblock an edge based at least in part on whether blocks forming the edge are predicted using SDIP.

FIG. 9 is a flowchart illustrating an example method for determining whether to deblock an edge based at least in part on whether blocks forming the edge are predicted using SDIP. The method of FIG. 9 may be performed by a video coding device, such as video encoder 20 or video decoder 30. For purposes of example, the method of FIG. 9 is described with respect to video decoder 30 (FIG. 3), although it should be understood that video encoder 20 (FIG. 2) may perform a similar method.

Initially, video decoder 30 may receive two neighboring, encoded blocks of video data that have a common edge. The two blocks may comprise CUs of a common LCU. Accordingly, video decoder 30 may also receive a CU quadtree for the LCU. Entropy decoding unit 70 may decode and interpret information indicative of encoding modes for the blocks to determine a prediction mode for the first block (200) and to determine a prediction mode for the second block, which in this case neighbors the first block (202).

Video decoder 30 may then decode the first and second blocks using the determined prediction modes (204). For example, for an inter-prediction mode, motion compensation unit 72 may retrieve a predictive value for the inter-predicted block from a previously coded frame, e.g., from reference frame memory 82. For an intra-prediction mode, intra-prediction unit 74 may calculate a predictive value for the intra-predicted block from neighboring, previously coded blocks of the same frame. Summer 80 may add the prediction value to an inverse quantized, inverse transformed residual value received from inverse transform unit 78.

After decoding the blocks, de-blocker 84 may determine whether to deblock an edge between the blocks based at least in part on whether the prediction modes for the blocks include SDIP (206). For example, de-blocker 84 may skip deblocking when at least one of the blocks is predicted using SDIP, or may adapt support and/or deblocking decision functions such that the support/functions do not cross SDIP PU boundaries in the blocks.

De-blocker 84 may then filter the blocks based on the determination (208). For example, when de-blocker 84 determines that the edge should be deblocked, de-blocker 84 may apply a deblocking filter to the values of the pixels of the blocks to smooth the transition between pixels near the edge between the blocks. In some examples, when at least one of the two blocks is predicted using SDIP, and when the edge is determined to be deblocked, de-blocker 84 may apply an adapted deblocking filter to filter values of the pixels of the blocks near the edge. After deblocking the edge (if the edge is determined to be deblocked), de-blocker 84 may store data for the blocks in reference frame memory 82 (210). Of course, video decoder 30 may also output the decoded data, and may also use the stored data for reference for future frames.

When performed by video encoder 20, the method may further include selecting the prediction modes for the two blocks having the common edge. That is, video encoder 20 may first select the prediction modes and then encode the blocks using the selected prediction modes. Of course, video encoder 20 may decode the encoded blocks, such that video encoder 20 can use the decoded versions of the blocks as reference for subsequently encoded data. The decoding process performed by video encoder 20 may conform substantially to the method described above, including the in-loop deblocking process.

In this manner, the method of FIG. 9 represents an example of a method including determining a first prediction mode for a first block of video data and a second prediction mode for a second block of video data, wherein the first block and the second block share a common edge, decoding the first block using the first prediction mode and the second block using the second prediction mode, and determining whether to deblock the common edge between the first block and the second block based at least in part on whether at least one of the first prediction mode and the second prediction mode comprises short distance intra-prediction (SDIP).

Figure 10:
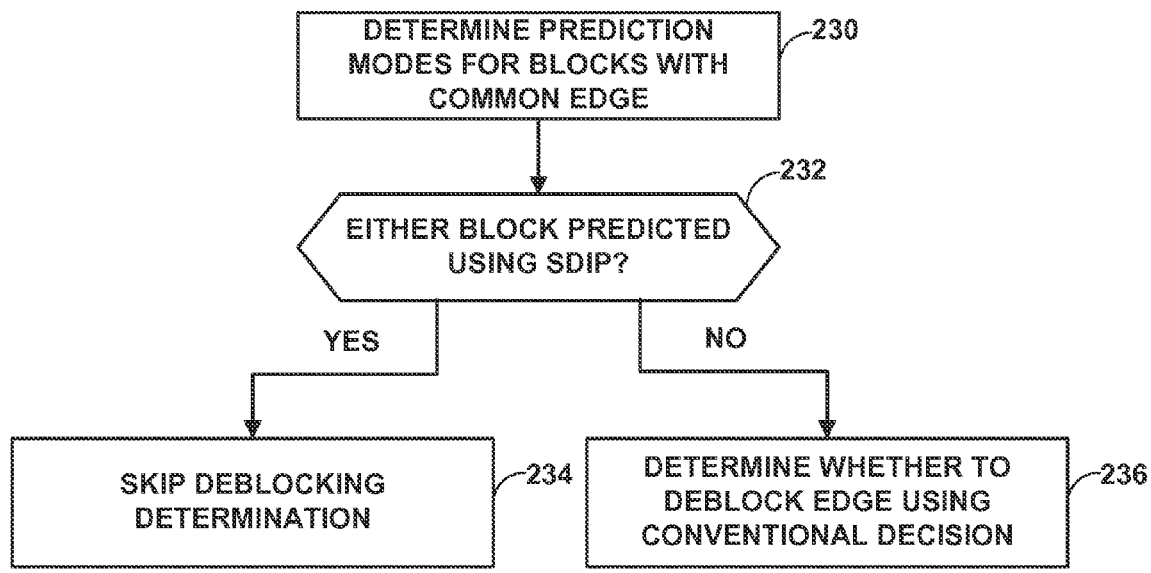
FIG. 10 is a flowchart illustrating another example method for determining whether to deblock a common edge between two blocks based at least in part on whether at least one of the blocks is predicted using SDIP.

FIG. 10 is a flowchart illustrating another example method for determining whether to deblock a common edge between two blocks based at least in part on whether at least one of the blocks is predicted using SDIP. The steps of FIG. 10 generally correspond to step 206 of FIG. 9. Accordingly, the method of FIG. 10 may also be performed by a video coding device, such as video encoder 20 or video decoder 30. Again, for purposes of example, the method of FIG. 10 is described with respect to video decoder 30.

In this example, video decoder 30 determines prediction modes for two blocks having a common edge (230). Video decoder 30 may then determine whether either of the two blocks is predicted using SDIP (232). If at least one of the two blocks is predicted using SDIP (that is, if at least one of a first prediction mode for the first block and a second prediction mode for the second block comprises SDIP) ("YES" branch of 232), video decoder 30 may skip the deblocking determination (234). That is, in this example, video decoder 30 may skip application of a deblocking decision function to a set of support in the area of the edge between the blocks when at least one of the two blocks is predicted using SDIP. On the other hand, if neither of the blocks is predicted using SDIP ("NO" branch of 232), de-blocker 84 of video decoder 30 may determine whether to deblock the edge using conventional techniques (236).

Figure 11:
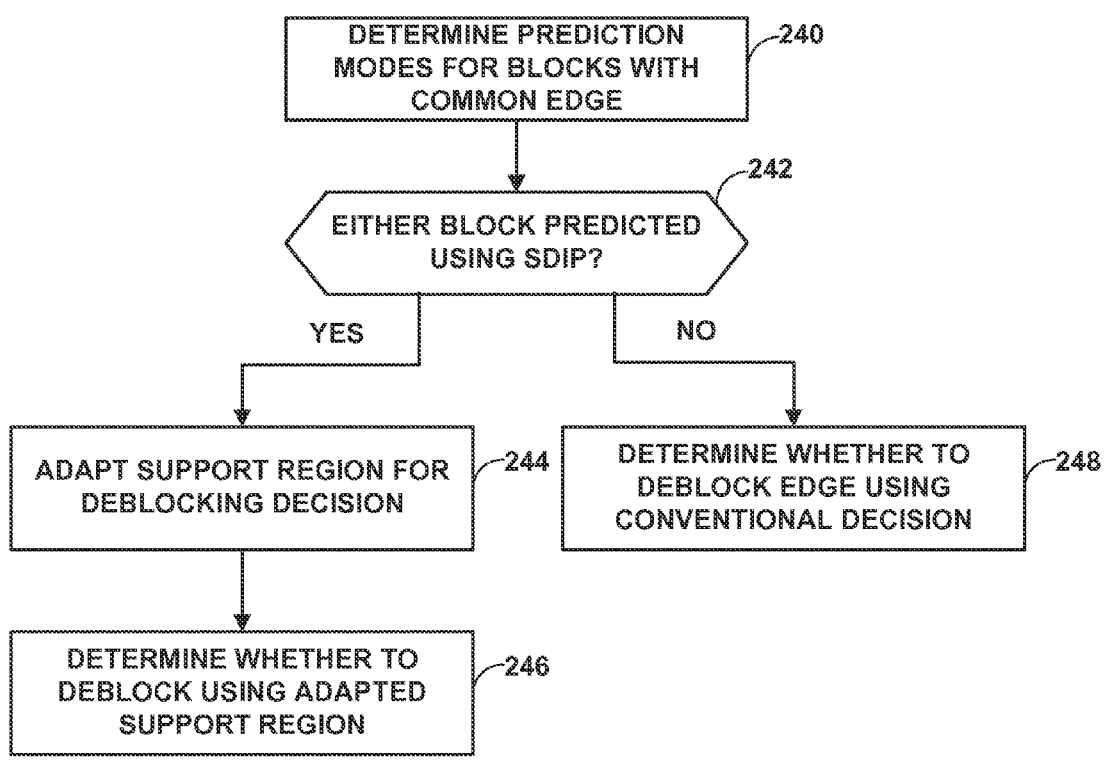
FIG. 11 is a flowchart illustrating another example method for determining whether to deblock a common edge between two blocks based at least in part on whether at least one of the blocks is predicted using SDIP.

FIG. 11 is a flowchart illustrating another example method for determining whether to deblock a common edge between two blocks based at least in part on whether at least one of the blocks is predicted using SDIP. The steps of FIG. 11 generally correspond to step 206 of FIG. 9. Again, for purposes of example, the method of FIG. 11 is described with respect to video decoder 30, although it should be understood that the method may be performed by other video coding devices, such as video encoder 20.

In this example, video decoder 30 also determines prediction modes for blocks with a common edge (240). Video decoder 30 also determines whether at least one of the blocks is predicted using SDIP (242). However, in this example, when at least one of the blocks is predicted using SDIP, video decoder 30 may adapt a support region to which a deblocking decision function is applied (244). Additionally or alternatively, video decoder 30 may adapt the deblocking decision function, based on the SDIP type. Video decoder 30 may then determine whether to deblock the edge using the adapted support region (and/or the adapted deblocking decision function) (246). The adapted support region may be constructed such that the support region does not cross SDIP PU boundaries within the blocks that are SDIP predicted. When neither block is predicted using SDIP, video decoder 30 may determine whether to deblock the edge using conventional techniques (248).

Figure 12:
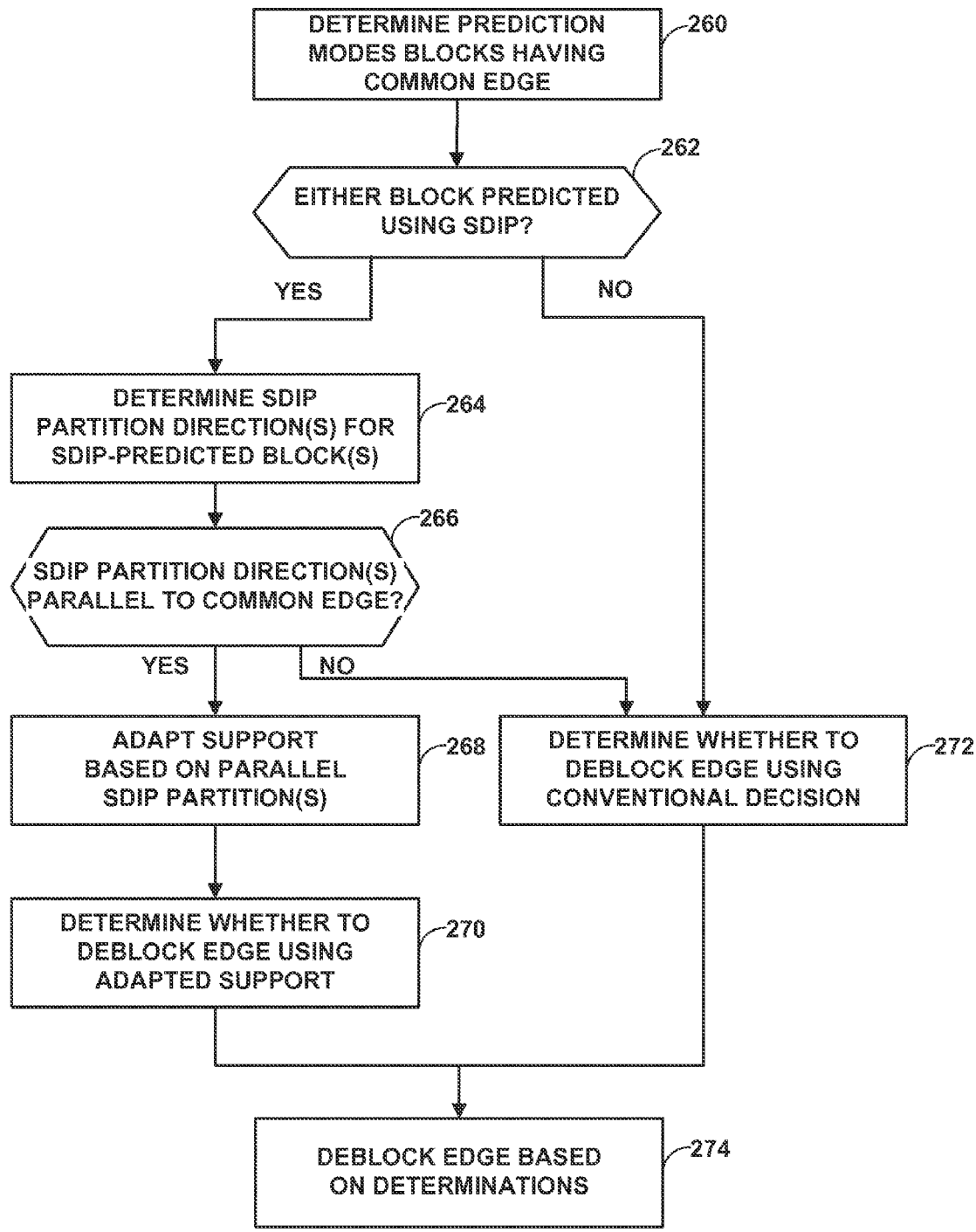
FIG. 12 is a flowchart illustrating yet another method for determining whether to deblock a common edge between two blocks based at least in part on whether at least one of the blocks is predicted using SDIP.

FIG. 12 is a flowchart illustrating yet another method for determining whether to deblock a common edge between two blocks based at least in part on whether at least one of the blocks is predicted using SDIP. The steps of FIG. 12 generally correspond to step 206 of FIG. 9. Again, for purposes of example, the method of FIG. 12 is described with respect to video decoder 30, although it should be understood that the method may be performed by other video coding devices, such as video encoder 20.

In this example, video decoder 30 also determines prediction modes for blocks with a common edge (260). Video decoder 30 also determines whether at least one of the blocks is predicted using SDIP (262). In this example, when at least one of the blocks is predicted using SDIP ("YES" branch of 262), video decoder 30 may determine SDIP partition directions for SDIP-predicted blocks (264). In general, the direction of SDIP partitions corresponds to the longer dimension of the SDIP partitions. De-blocker 84 of video decoder 30 may then determine whether the SDIP partition directions are parallel to the common edge (266).

When at least one of the SDIP partitions are parallel to the common edge between the blocks ("YES" branch of 266), de-blocker 84 of video decoder 30 may adapt a set of support pixels based on the parallel SDIP partitions, such that the support does not cross SDIP PU partition boundaries (268). For example, de-blocker 84 may ensure that support pixels do not cross edges of the SDIP PU partition (of course, aside from the current edge under consideration for deblocking). De-blocker 84 may then determine whether to deblock the edge between the blocks using the adapted set of support (270), e.g., by executing an appropriate function on the set of support pixels to determine whether there is a high frequency change along the set of support pixels. On the other hand, when neither of the blocks is predicted using SDIP ("NO" branch of 262) or when all SDIP PU partitions are perpendicular to the common edge between the two blocks ("NO" branch of 266), de-blocker 84 may determine whether to deblock the edge using conventional deblocking determination techniques. In either case, de-blocker 84 may deblock the edge (e.g., filter pixels near the edge) based on the determinations of whether to deblock the edge (274).

Figure 13:
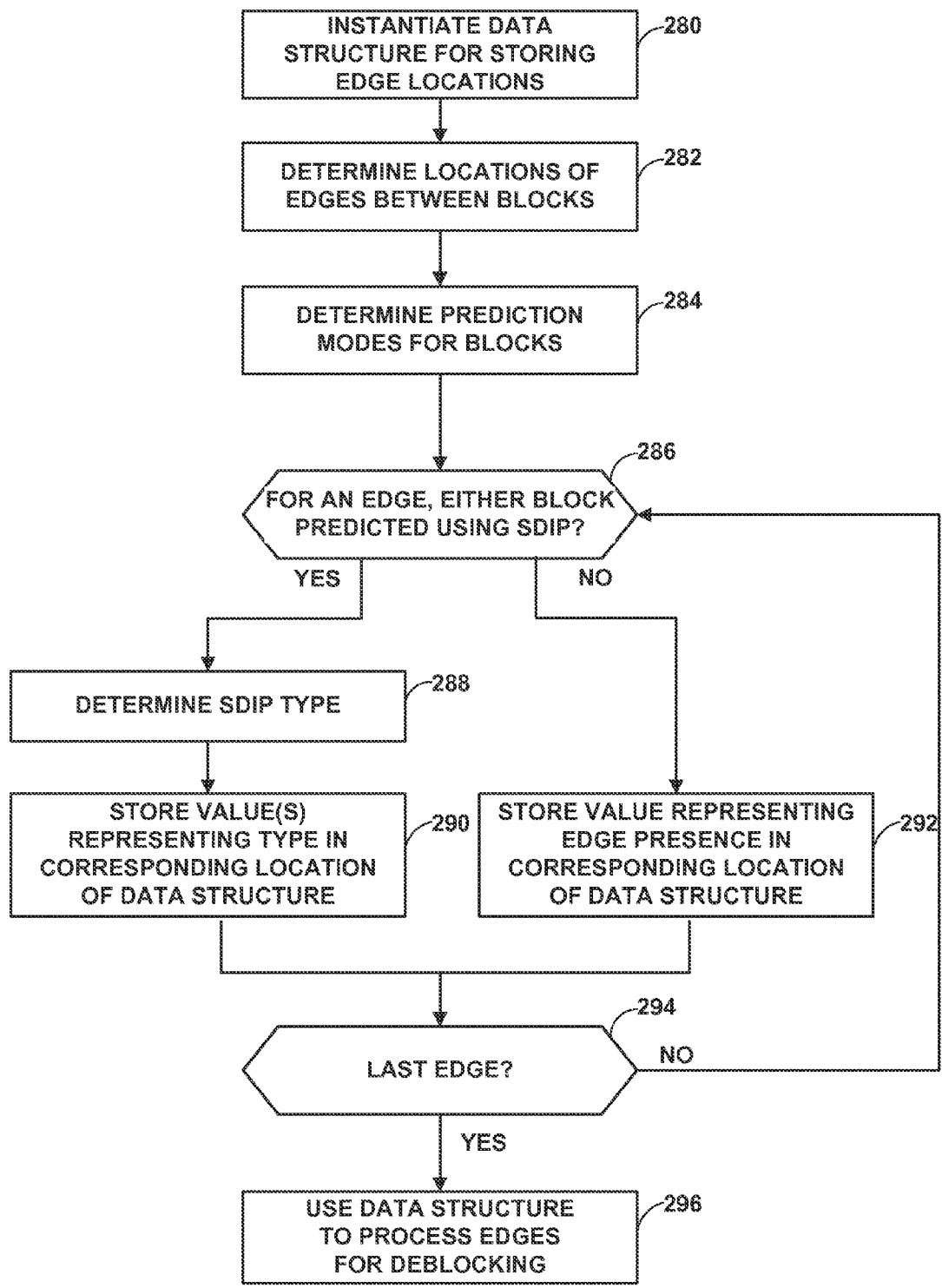
FIG. 13 is a flowchart illustrating an example method for storing edge locations in a data structure, which may also store indications of SDIP PU partitions.

FIG. 13 is a flowchart illustrating an example method for storing edge locations in a data structure, which may also store indications of SDIP PU partitions. The data structure may be adapted to store both Boolean values indicative of whether an edge is present or not at a particular location, as well as SDIP flags indicative of whether a corresponding CU is SDIP predicted. For purposes of example, the method of FIG. 13 is described with respect to video decoder 30, although it should be understood that the method may be performed by other video coding devices, such as video encoder 20. The method of FIG. 13 may generally be performed prior to step 206 of FIG. 9, and may be performed in conjunction with the methods of any of FIGS. 9-12.

Initially, de-blocker 84 of video decoder 30 may instantiate a data structure for storing edge locations within an LCU (280). The data structure may comprise, for example, an array having horizontal and vertical locations corresponding to potential smallest-sized CUs of the LCU. The data structure may further comprise locations for both horizontal edges and vertical edges. Values at each of the locations may be initialized to "false" or other values indicating that no edges are present at the corresponding locations of the LCU.

De-blocker 84 may then determine locations of edges between blocks, e.g., sub-CUs of the LCU (282). For example, de-blocker 84 may determine locations of CUs based on a CU quadtree for the LCU. Moreover, using the CU quadtree, de-blocker 84 may determine prediction modes for the blocks (e.g., uni-directional inter-prediction, bi-directional inter-prediction, directional intra-prediction, DC intra-prediction, or SDIP) (284). For each edge in the LCU, de-blocker 84 may determine whether blocks forming the edge are predicted using SDIP (286).

When at least one of the blocks for an edge is predicted using SDIP ("YES" branch of 286), de-blocker 84 may determine an SDIP type for the block (288). The SDIP type may describe, for example, a direction (that is, orientation) of the SDIP PU partitions, as well as whether the SDIP PU partitions are divided into further SDIP PU partitions. De-blocker 84 may then store values representative of the SDIP type in a corresponding location of the data structure (290). These values may comprise, for example, SDIP flags such as an SDIP flag, an SDIP direction flag, and an SDIP mode flag. On the other hand, when both blocks are predicted using prediction modes other than SDIP ("NO" branch of 286), de-blocker 84 may store a value representing that an edge is present in a corresponding location of the data structure (292). This value may comprise a Boolean value, for example.

After processing of the most recent edge, de-blocker 84 may determine whether the most recent edge is the last edge of the LCU (294). If the most recent edge was not the last edge of the LCU ("NO" branch of 294), de-blocker 84 may analyze a next edge of the LCU according to steps 286-292. If the most recent edge was the last edge of the LCU, however, ("YES" branch of 294), then de-blocker 84 may use the data structure to process edges for deblocking (296). For example, for Boolean values in the data structure, de-blocker 84 may determine whether corresponding edges in the LCU should be deblocked, and apply deblocking filters to pixels in the neighborhood of edges determined to be deblocked. However, for SDIP flags in the data structure, de-blocker 84 may determine SDIP types and orientations to determine, e.g., whether and how to adapt deblocking decision functions, support to which the deblocking decision functions are applied, and/or deblocking filters. Moreover, de-blocker 84 may ensure that each edge of SDIP PU partitions is processed properly using the data structure, e.g., according to Tables 3-7 above.

The method of FIG. 13 may address memory storage requirements of an edge filtering array for SDIP partitions, which may otherwise be increased to store edge filtering status of, for example, 1×16, 16×1, 2×8, and 8×2 SDIP partitions. The edge filtering array can be employed in the deblocking algorithm implementation, for example, to determine whether to proceed with the computation of the boundary strength, which subsequently can be employed to determine deblocking filtering type, and the like. The method of FIG. 13 includes marking types of SDIP partitions when the partitions have a dimension that is smaller than, for example, 4×4 blocks corresponding to elements in the edge filtering array, for example, for the 1×16, 16×1, 2×8, 8×2 SDIP partitions. Subsequently, the boundary strength computation or other steps of the deblocking algorithm may employ these SDIP type markings to alter or adapt the processing.

In this manner, the method of FIG. 13 represents an example of a method including determining a first prediction mode for a first block of video data and a second prediction mode for a second block of video data, wherein the first block and the second block share a common edge, decoding the first block using the first prediction mode and the second block using the second prediction mode, and determining whether to deblock the common edge between the first block and the second block based at least in part on whether at least one of the first prediction mode and the second prediction mode comprises short distance intra-prediction (SDIP), and when at least one of the first prediction mode and the second prediction mode comprises SDIP, storing a value indicative of a partition size for SDIP partitions in the data structure at the location of the data structure corresponding to the common edge, and deblocking edges based on values stored in the data structure corresponding to the edges.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:
1. A method of coding video data, the method comprising:
determining a first prediction mode for a first block of video data and a second prediction mode for a second block of video data, wherein the first block and the second block share a common edge;
decoding the first block using the first prediction mode and the second block using the second prediction mode; and
determining whether to deblock the common edge between the first block and the second block based at least in part on whether at least one of the first prediction mode or the second prediction mode comprises short distance intra-prediction (SDIP), wherein determining whether to deblock the common edge comprises, when at least one of the first prediction mode and the second prediction mode comprises SDIP:
determining whether SDIP prediction units (PUs) are oriented perpendicular to the common edge;
applying a first deblocking decision function to an equal number of support pixels on either side of the com- mon edge when all of the SDIP PUs are oriented perpendicular to the common edge;

applying a second, different deblocking decision function to an adapted set of support pixels when at least one of the SDIP PUs is oriented parallel to the common edge; and deblocking the common edge when the second deblocking decision function indicates that the common edge is to be deblocked.

2. The method of claim 1, further comprising, after determining to deblock the common edge, determining a deblocking filter to deblock the common edge based at least in part on whether at least one of the first prediction mode or the second prediction mode comprises SDIP.

3. The method of claim 2, wherein determining the deblocking filter comprises, when at least one of the first prediction mode or the second prediction mode comprises SDIP:

determining whether the SDIP PUs are oriented perpendicular to the common edge; and selecting a deblocking filter having coefficients that can be applied to an equal number of support pixels on either side of the common edge when all of the SDIP PUs are oriented perpendicular to the common edge.

4. The method of claim 1, wherein determining whether to deblock the common edge comprises determining not to deblock the edge when at least one of the first prediction mode or the second prediction mode comprises SDIP.

5. The method of claim 1, wherein determining whether to deblock the common edge comprises selecting an adapted set of support to which to apply a deblocking decision function used to determine whether to deblock the common edge and to which to apply a deblocking filter, when at least one of the first prediction mode or the second prediction mode comprises SDIP.

6. The method of claim 1, wherein determining whether to deblock the common edge comprises selecting an adapted set of support to which to apply a deblocking decision function used to determine whether to deblock the edge and to which to apply the deblocking filter, when at least one of the first prediction mode or the second prediction mode comprises SDIP, such that the adapted set of support does not cross prediction unit (PU) boundaries for SDIP PUs in the first block and the second block.

7. The method of claim 1, wherein the first block and the second block comprise blocks of a frame, the method further comprising:

when at least one of the first prediction mode or the second prediction mode comprises SDIP, storing a value indicative of a partition size for SDIP partitions in a data structure at the location of the data structure corresponding to the common edge; and deblocking edges based on values stored in the data structure corresponding to the edges.

8. The method of claim 1, wherein determining the first prediction mode and the second prediction mode comprises selecting, by a video encoder, the first prediction mode and the second prediction mode, the method further comprising, prior to decoding the first block and the second block:

encoding the first block using the first prediction mode; and encoding the second prediction mode using the second prediction mode, wherein decoding the first block and the second block comprises decoding, by the video encoder, the first block and the second block.

9. The method of claim 1, wherein determining the first prediction mode and the second prediction mode comprises receiving, by a video decoder, information indicative of the first prediction mode and the second prediction mode.

10. The method of claim 1, the method being executable on a wireless communication device, wherein the device comprises:

a memory configured to store the video data;

a processor configured to execute instructions to process the video data stored in the memory; and a receiver configured to receive a signal including an encoded version of the video data and to store the video data to the memory.

11. The method of claim 10, wherein the wireless communication device is a cellular telephone and the signal is received by the receiver and modulated according to a cellular communication standard.

12. An apparatus for coding video data, the apparatus comprising:

a memory configured to store video data; and a video coder configured to:

determine a first prediction mode for a first block of the video data and a second prediction mode for a second block of video data, wherein the first block and the second block share a common edge, decode the first block using the first prediction mode and the second block using the second prediction mode, and determine whether to deblock the common edge between the first block and the second block based at least in part on whether at least one of the first prediction mode or the second prediction mode comprises short distance intra-prediction (SDIP), wherein to determine whether to deblock the common edge, the video coder is configured to, when at least one of the first prediction mode and the second prediction mode comprises SDIP:

determine whether SDIP prediction units (PUs) are oriented perpendicular to the common edge;

apply a first deblocking decision function to an equal number of support pixels on either side of the common edge when all of the SDIP PUs are oriented perpendicular to the common edge;

apply a second, different deblocking decision function to an adapted set of support pixels when at least one of the SDIP PUs is oriented parallel to the common edge; and deblock the common edge when the second deblocking decision function indicates that the common edge is to be deblocked.

13. The apparatus of claim 12, wherein the video coder is configured to, after determining to deblock the common edge, determine a deblocking filter to deblock the common edge based at least in part on whether at least one of the first prediction mode or the second prediction mode comprises SDIP.

14. The apparatus of claim 13, wherein to determine the deblocking filter, the video coder is configured to, when at least one of the first prediction mode or the second prediction mode comprises SDIP, determine whether the SDIP PUs are oriented perpendicular to the common edge, and select a deblocking filter having coefficients that can be applied to an equal number of support pixels on either side of the common edge when all of the SDIP PUs are oriented perpendicular to the common edge.

15. The apparatus of claim 12, wherein the video coder is configured to determine not to deblock the edge when at least one of the first prediction mode or the second prediction mode comprises SDIP.

16. The apparatus of claim 12, wherein to determine whether to deblock the common edge, the video coder is configured to select an adapted set of support to which to apply a deblocking decision function used to determine whether to deblock the common edge and to which to apply a deblocking filter, when at least one of the first prediction mode or the second prediction mode comprises SDIP.

17. The apparatus of claim 12, wherein to determine whether to deblock the common edge, the video coder is configured to select an adapted set of support to which to apply a deblocking decision function used to determine whether to deblock the edge and to which to apply the deblocking filter, when at least one of the first prediction mode or the second prediction mode comprises SDIP, such that the adapted set of support does not cross prediction unit (PU) boundaries for SDIP PUs in the first block and the second block.

18. The apparatus of claim 12, wherein the first block and the second block comprise blocks of a frame, and wherein the video coder is configured to store a value indicative of a partition size for SDIP partitions in the data structure at the location of the data structure corresponding to the common edge when at least one of the first prediction mode or the second prediction mode comprises SDIP, and deblock edges based on values stored in the data structure corresponding to the edges.

19. The apparatus of claim 12, wherein the video coder comprises a video encoder, and wherein the video encoder is configured to select the first prediction mode and the second prediction mode and, prior to decoding the first block and the second block, to encode the first block using the first prediction mode, encode the second prediction mode using the second prediction mode, and decode the first block and the second block after encoding the first block and the second block.

20. The apparatus of claim 12, wherein the video coder comprises a video decoder, and wherein to determine the first prediction mode and the second prediction mode, the video decoder is configured to receive information indicative of the first prediction mode and the second prediction mode.

21. The apparatus of claim 12, wherein the apparatus comprises at least one of:
an integrated circuit;
a microprocessor; or
a wireless communication device that includes the video coder.

22. The apparatus of claim 12, wherein the apparatus is a wireless communication device, and wherein the video coder comprises a video decoder, the device further comprising a receiver configured to receive a signal including an encoded version of the video data.

23. The apparatus of claim 22, wherein the wireless communication device is a cellular telephone and the signal is received by the transceiver and modulated according to a cellular communication standard.

24. An apparatus for encoding video data, the apparatus comprising:
means for determining a first prediction mode for a first block of video data and a second prediction mode for a second block of video data, wherein the first block and the second block share a common edge;
means for decoding the first block using the first prediction mode and the second block using the second prediction mode; and
means for determining whether to deblock the common edge between the first block and the second block based at least in part on whether at least one of the first prediction mode or the second prediction mode comprises short distance intra-prediction (SDIP), wherein the means for determining whether to deblock the common edge comprises:
means for determining whether SDIP prediction units (PUs) are oriented perpendicular to the common edge when at least one of the first prediction mode and the second prediction mode comprises SDIP;
means for applying a first deblocking decision function to an equal number of support pixels on either side of the common edge when all of the SDIP PUs are oriented perpendicular to the common edge when at least one of the first prediction mode and the second prediction mode comprises SDIP;
means for applying a second, different deblocking decision function to an adapted set of support pixels when at least one of the SDIP PUs is oriented parallel to the common edge and when at least one of the first prediction mode and the second prediction mode comprises SDIP; and
means for deblocking the common edge when the second deblocking decision function indicates that the common edge is to be deblocked and when at least one of the first prediction mode and the second prediction mode comprises SDIP.

25. The apparatus of claim 24, further comprising means for, after determining to deblock the common edge, determining a deblocking filter to deblock the common edge based at least in part on whether at least one of the first prediction mode or the second prediction mode comprises SDIP.

26. The apparatus of claim 25, wherein the means for determining the deblocking filter comprises means for determining whether the SDIP PUs are oriented perpendicular to the common edge and means for selecting a deblocking filter having coefficients that can be applied to an equal number of support pixels on either side of the common edge when all of the SDIP PUs are oriented perpendicular to the common edge, when at least one of the first prediction mode or the second prediction mode comprises SDIP.

27. The apparatus of claim 24, wherein the means for determining whether to deblock the common edge comprises means for determining not to deblock the edge when at least one of the first prediction mode or the second prediction mode comprises SDIP.

28. The apparatus of claim 24, wherein the means for determining whether to deblock the common edge comprises means for selecting an adapted set of support to which to apply a deblocking decision function used to determine whether to deblock the common edge and to which to apply a deblocking filter, when at least one of the first prediction mode or the second prediction mode comprises SDIP.

29. The apparatus of claim 24, wherein the means for determining whether to deblock the common edge comprises means for selecting an adapted set of support to which to apply a deblocking decision function used to determine whether to deblock the edge and to which to apply the deblocking filter, when at least one of the first prediction mode or the second prediction mode comprises SDIP, such that the adapted set of support does not cross prediction unit (PU) boundaries for SDIP PUs in the first block and the second block.

30. The apparatus of claim 24, wherein the first block and the second block comprise blocks of a frame, further comprising:
means for storing, when at least one of the first prediction mode or the second prediction mode comprises SDIP, a value indicative of a partition size for SDIP partitions in the data structure at the location of the data structure corresponding to the common edge; and means for deblocking edges based on values stored in the data structure corresponding to the edges.

31. The apparatus of claim 24, wherein the means for determining the first prediction mode and the second prediction mode comprises means for selecting, during an encoding process, the first prediction mode and the second prediction mode, further comprising:

means for encoding the first block using the first prediction mode prior to decoding the first block; and means for encoding the second prediction mode using the second prediction mode prior to decoding the second block.

32. The apparatus of claim 24, wherein the means for determining the first prediction mode and the second prediction mode comprises means for receiving information indicative of the first prediction mode and the second prediction mode.

33. A computer program product comprising a non-transitory computer-readable storage medium having stored thereon instructions that, when executed, cause one or more processors of a device for coding video data to:

determine a first prediction mode for a first block of video data and a second prediction mode for a second block of video data, wherein the first block and the second block share a common edge;

decode the first block using the first prediction mode and the second block using the second prediction mode; and determine whether to deblock the common edge between the first block and the second block based at least in part on whether at least one of the first prediction mode or the second prediction mode comprises short distance intra-prediction (SDIP), wherein the instructions that cause the processor to determine whether to deblock the common edge comprise instructions that cause the processor to, when at least one of the first prediction mode and the second prediction mode comprises SDIP:

determine whether SDIP prediction units (PUs) are oriented perpendicular to the common edge;

apply a first deblocking decision function to an equal number of support pixels on either side of the common edge when all of the SDIP PUs are oriented perpendicular to the common edge;

apply a second, different deblocking decision function to an adapted set of support pixels when at least one of the SDIP PU is oriented parallel to the common edge; and deblock the common edge when the second deblocking decision function indicates that the common edge is to be deblocked.

34. The computer program product of claim 33, further comprising instructions that cause the one or more processors to, after determining to deblock the common edge, determine a deblocking filter to deblock the common edge based at least in part on whether at least one of the first prediction mode or the second prediction mode comprises SDIP.

35. The computer program product of claim 34, wherein the instructions that cause the one or more processors to determine the deblocking filter comprise instructions that cause the one or more processors to, when at least one of the first prediction mode or the second prediction mode comprises SDIP:

determine whether the SDIP PUs are oriented perpendicular to the common edge; and select a deblocking filter having coefficients that can be applied to an equal number of support pixels on either side of the common edge when all SDIP PUs are oriented perpendicular to the common edge.

36. The computer program product of claim 33, wherein the instructions that cause the one or more processors to determine whether to deblock the common edge comprise instructions that cause the one or more processors to determine not to deblock the edge when at least one of the first prediction mode or the second prediction mode comprises SDIP.

37. The computer program product of claim 33, wherein the instructions that cause the one or more processors to determine whether to deblock the common edge comprise instructions that cause the one or more processors to select an adapted set of support to which to apply a deblocking decision function used to determine whether to deblock the common edge and to which to apply a deblocking filter, when at least one of the first prediction mode or the second prediction mode comprises SDIP.

* * * * *